US011299135B2

(12) United States Patent
Yamamoto et al.

(10) Patent No.: US 11,299,135 B2
(45) Date of Patent: Apr. 12, 2022

(54) VEHICLE BRAKE CONTROL DEVICE

(71) Applicant: ADVICS CO., LTD., Kariya (JP)

(72) Inventors: Takayuki Yamamoto, Nagakute (JP);
Hiroyuki Kodama, Kariya (JP);
Hiroyuki Ando, Nagoya (JP)

(73) Assignee: ADVICS CO., LTD., Kariya (JP)

( * ) Notice: Subject to any disclaimer, the term of this patent is extended or adjusted under 35 U.S.C. 154(b) by 159 days.

(21) Appl. No.: 16/641,929

(22) PCT Filed: Sep. 26, 2018

(86) PCT No.: PCT/JP2018/035702
§ 371 (c)(1),
(2) Date: Feb. 25, 2020

(87) PCT Pub. No.: WO2019/065737
PCT Pub. Date: Apr. 4, 2019

(65) Prior Publication Data
US 2020/0247379 A1 Aug. 6, 2020

(30) Foreign Application Priority Data
Sep. 26, 2017 (JP) .............................. JP2017-184272

(51) Int. Cl.
B60T 13/68 (2006.01)
B60T 13/20 (2006.01)

(52) U.S. Cl.
CPC .............. B60T 13/68 (2013.01); B60T 13/20 (2013.01)

(58) Field of Classification Search
CPC ...... B60T 8/441; B60T 8/4077; B60T 13/146;
B60T 13/20; B60T 13/68; B60T 13/686
See application file for complete search history.

(56) References Cited

U.S. PATENT DOCUMENTS

| 7,309,112 | B2* | 12/2007 | Isono ................... B60W 10/26 303/11 |
| 8,061,786 | B2* | 11/2011 | Drumm .................. B60T 7/042 303/115.4 |
| 8,449,047 | B2* | 5/2013 | Drumm ................. B60T 8/4077 303/115.4 |
| 8,500,217 | B2* | 8/2013 | Isono ...................... B60T 8/441 303/115.4 |
| 10,029,663 | B2* | 7/2018 | Knechtges .............. B60T 13/66 |

(Continued)

FOREIGN PATENT DOCUMENTS

JP 2013-107561 A 6/2013
JP 2016-165913 A 9/2016

Primary Examiner — Thomas W Irvin
(74) Attorney, Agent, or Firm — Oblon, McClelland, Maier & Neustadt, L.L.P.

(57) ABSTRACT

A brake control device including a pressure adjusting unit including an electric pump and an electromagnetic valve, and that adjusts, using the electromagnetic valve, a brake liquid discharged by the electric pump to an adjusted liquid pressure and introduces the adjusted liquid pressure to the wheel cylinders of the rear wheels; and a master unit that includes a master cylinder and a master piston, and that includes a master chamber connected to the wheel cylinders of the front wheels and a servo chamber to which the adjusted liquid pressure is introduced and which provides, to the master piston, an advancing force that opposes a retreating force applied to the master piston by the master chamber.

3 Claims, 5 Drawing Sheets

(56) References Cited

U.S. PATENT DOCUMENTS

| | | | |
|---|---|---|---|
| 2003/0214177 A1 | 11/2003 | Kusano et al. | |
| 2006/0220451 A1* | 10/2006 | Drumm | B60T 8/4077 |
| | | | 303/114.1 |
| 2008/0258545 A1* | 10/2008 | Drumm | B60T 8/4018 |
| | | | 303/114.1 |
| 2008/0258546 A1* | 10/2008 | Drumm | B60T 7/042 |
| | | | 303/115.4 |
| 2015/0021976 A1* | 1/2015 | Miwa | B60T 13/586 |
| | | | 303/6.01 |
| 2015/0314767 A1 | 11/2015 | Miyazaki et al. | |
| 2020/0039490 A1* | 2/2020 | Kobayashi | B60T 13/146 |
| 2020/0262407 A1* | 8/2020 | Yamamoto | B60T 13/686 |
| 2021/0197779 A1* | 7/2021 | Maruyama | B60T 13/146 |
| 2021/0213835 A1* | 7/2021 | Yamamoto | B60T 1/10 |
| 2021/0221231 A1* | 7/2021 | Maruyama | B60T 8/17 |
| 2021/0229648 A1* | 7/2021 | Yamamoto | B60T 13/586 |
| 2021/0261106 A1* | 8/2021 | Yamamoto | B60T 8/1761 |

* cited by examiner

WHEN FRONT WHEEL INCLUDES REGENERATIVE GENERATOR

WHEN REAR WHEEL INCLUDES REGENERATIVE GENERATOR

VEHICLE BRAKE CONTROL DEVICE

TECHNICAL FIELD

The present invention relates to a vehicle brake control device.

BACKGROUND ART

Patent Literature 1 describes that, for the purpose of "preventing decrease in braking force at the time of backup in a vehicle braking system to which a by-wire brake system is applied", "when a failure such as an abnormality in a communication network occurs in the vehicle braking system, first and second shut-off valves are opened to cause a slave cylinder and a master cylinder to communicate to each other. Furthermore, first and second slave pistons are controlled to maintain the current positions by driving the motor. Thereafter, when the operation of the brake pedal is released, the operation of the motor is stopped."

In the device described in Patent Literature 1, the slave cylinder drives a ball screw shaft with the power of a motor serving as an electric actuator, and generates brake liquid pressure by the first and second slave pistons based on the drive of the ball screw shaft. The first and second slave pistons are each biased in the retreating direction by a coil spring. The ball screw shaft is driven in the advancing direction by the power of the motor, and moves the first and second slave pistons in the advancing direction against the biasing force of the coil spring, thereby generating brake liquid pressure. In other words, in this device, a tandem-type slave cylinder is employed, a ball screw is provided on the center axis of the slave cylinder, the rotational power of the electric motor is converted into linear power of the slave piston by the ball screw, and the brake liquid pressure is generated. Since the dimension of the slave cylinder in the longitudinal direction is long due to its structure, it is desired to shorten the length.

The applicant has developed a brake control device for a vehicle as described in Patent Literature 2. Specifically, the device includes "a mechanical regulator that sends out an output pressure corresponding to the pilot pressure supplied to a pilot chamber from an output port based on the brake liquid pressure of a high-pressure source, a switching unit connected to the pilot chamber, a first pilot pressure generator connected to the pilot chamber by way of the switching unit to supply a first pilot pressure to the pilot chamber, a second pilot pressure generator connected to the pilot chamber by way of the switching unit to supply a second pilot pressure to the pilot chamber, and a wheel cylinder that generates a brake force based on an output pressure supplied from the output port of the mechanical regulator, in which the switching unit supplies either one of the first pilot pressure and the second pilot pressure to the pilot chamber".

This device also employs a tandem-type master cylinder. The master cylinder includes a master piston which is arranged with a separation distance B in the advancing direction of an input piston and is slidable in the axis line direction independently of the input piston. Furthermore, a reaction force chamber is formed between an end face on the distal end side of the input piston and a partition wall serving as the bottom portion of the input cylinder hole, and a reaction force pressure corresponding to the amount of movement of the input piston is generated in the reaction force chamber. Since the reaction force chamber is provided at the end of the master cylinder, a reduction in dimension in the center axis direction is also desired in this configuration.

CITATIONS LIST

Patent Literature

Patent Literature 1: Japanese Unexamined Patent Publication No. 2016-165913
Patent Literature 2: Japanese Unexamined Patent Publication No. 2013-107561

SUMMARY OF INVENTION

Technical Problems

An object of the present invention is to provide a vehicle brake control device, in which the dimension in the longitudinal direction (axial direction) is reduced and which is highly mountable on a vehicle.

Solutions to Problems

A vehicle brake control device according to the present invention adjusts a front wheel liquid pressure (Pwf) in a front wheel cylinder (CWf) provided on a front wheel (WHO of the vehicle, and a rear wheel liquid pressure (Pwr) in a rear wheel cylinder (CWr) provided on a rear wheel (WHr) of the vehicle depending on an operation of a brake operation member (BP) of the vehicle, the vehicle brake control device including:

"a pressure adjusting unit (YC) that includes an electric pump (DC) and an electromagnetic valve (UC), and that adjusts a brake liquid (BF) discharged by the electric pump (DC) to an adjusted liquid pressure (Pc) using the electromagnetic valve (UC), and introduces the adjusted liquid pressure (Pc) to the rear wheel cylinders (CWr)"; and "a master unit (YM) that includes a master cylinder (CM) and a master piston (PM), and that includes 'a master chamber (Rm) connected to the front wheel cylinder (CWf)', and 'a servo chamber (Rs) to which the adjusted liquid pressure (Pc) is introduced, and that applies, to the master piston (PM), an advancing force (Fa) that opposes a retreating force (Fb) applied to the master piston (PM) by the master chamber (Rm)'".

According to the above configuration, a liquid pressure chamber is not provided in the master cylinder CM of the brake control device SC for the rear wheel cylinder CWr. Since the master chamber for the rear wheel is omitted, shortening is achieved in the longitudinal direction of the master cylinder CM. The reflux of the brake liquid BF by the electric pump DC is used for the adjustment of the adjusted liquid pressure Pc in the pressure adjusting unit YC. Since the amount of brake liquid BF is unlimited, even a device that requires a large flow rate can be downsized. Furthermore, in the pressure adjusting unit YC, the reflux of the brake liquid BF is narrowed by the electromagnetic valve UC, and the adjusted liquid pressure Pc is adjusted. The servo control of the servo chamber Rs located on the rear surface of the master chamber Rm and the fluid passage related to the rear wheel system is performed by the adjustment in the pressure adjusting unit YC. Since the adjusted liquid pressure Pc is increased from "0" at the time of braking, control accuracy (resolution of liquid pressure) in the low-pressure region can be easily ensured.

DESCRIPTION OF EMBODIMENTS

Symbols of Components, Etc., and Suffixes at End of Symbols

In the following description, components, calculation processes, signals, characteristics, and values having the same symbol such as "ECU" have the same functions. Suffixes "i" to "l" added to the end of various symbols are comprehensive symbols indicating which wheel they are related to. Specifically, indicates a right front wheel, "j" indicates a left front wheel, "k" indicates a right rear wheel, and "l" indicates a left rear wheel. For example, respective four wheel cylinders are described as a right front wheel cylinder CWi, a left front wheel cylinder CWj, a right rear wheel cylinder CWk, and a left rear wheel cylinder CWl. Furthermore, the suffixes "i" to "l" at the end of the symbols can be omitted. When the suffixes "i" to "l" are omitted, each symbol represents a generic name of each of the four wheels. For example, "WH" represents each wheel, and "CW" represents each wheel cylinder.

The suffixes "f" and "r" added to the end of various symbols are comprehensive symbols indicating which of the two braking systems, for the front and rear wheels, they are related to. Specifically, "f" indicates the front wheel system, and "r" indicates the rear wheel system. For example, two fluid pumps of a lower fluid unit YL are described as a front wheel fluid pump QLf and a rear wheel fluid pump QLr. Furthermore, the suffixes "f" and "r" at the end of the symbols can be omitted. When the suffixes "f" and "r" are omitted, each symbol represents a generic name of each of the two braking systems. For example, "QL" represents the lower fluid pump in the front and rear braking systems.

When the operation of the brake control device SC is in an appropriate state, the braking performed by the brake control device SC is referred to as "control braking". When the operation of the brake control device SC is in a malfunction state, braking only by the driver's operation force is referred to as "manual braking". Therefore, in manual braking, the brake control device SC is not used.

Figure 1:
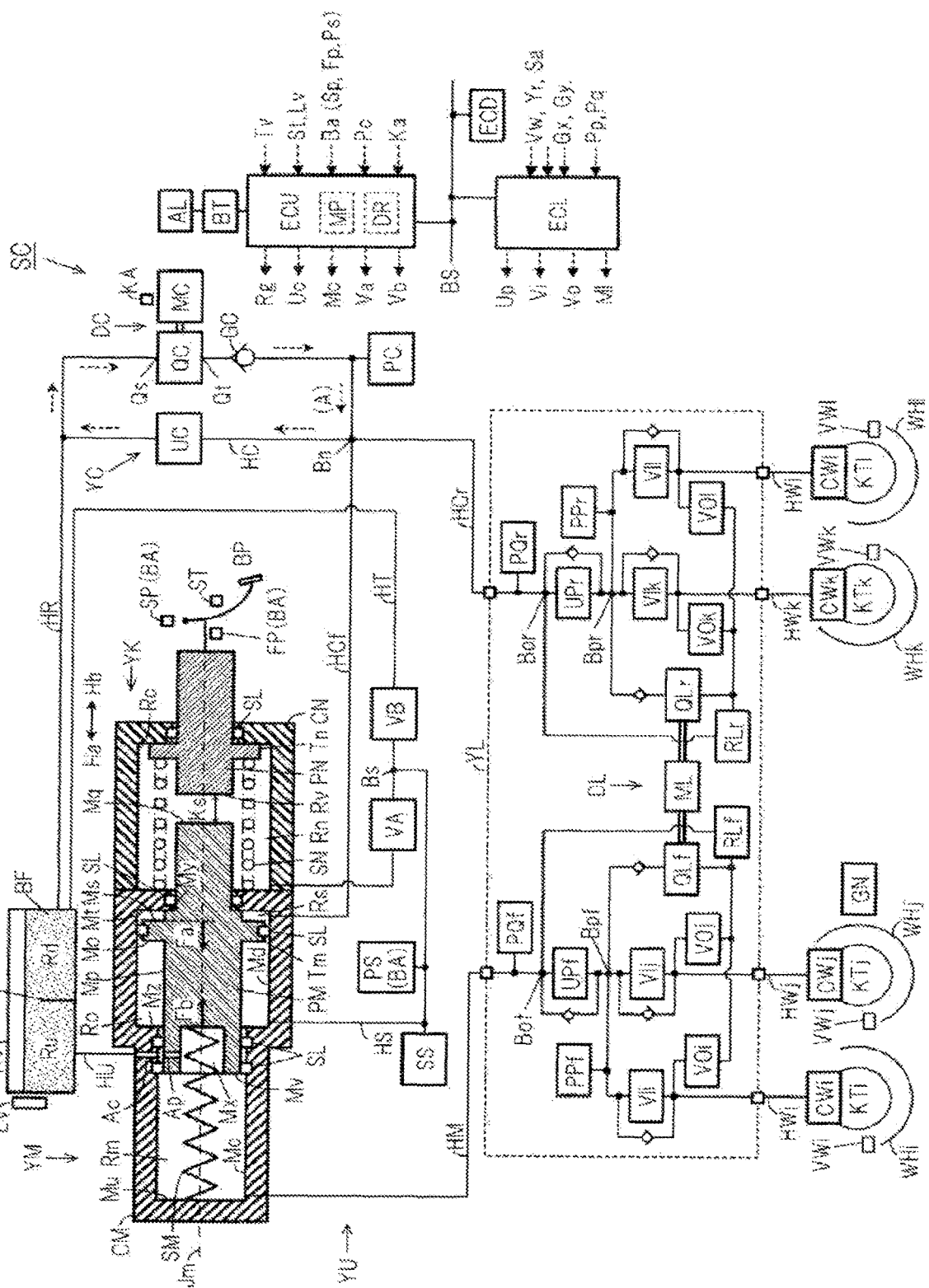
FIG. 1 is an overall configuration view describing an embodiment of a vehicle brake control device SC according to the present invention.

Embodiment of a Vehicle Brake Control Device According to the Present Invention An embodiment of the brake control device SC according to the present invention will be described with reference to an overall configuration view of FIG. 1. In a general vehicle, fluid passages of two systems are employed to ensure redundancy. The fluid passage is a passage for moving the brake liquid BF which is working liquid of the brake control device, and corresponds to a brake piping, a fluid path of a fluid unit, a hose, and the like. The inside of the fluid passage is filled with the brake liquid BF. In the fluid passage, the side closer to the reservoir RV (the side farther from the wheel cylinder CW) is referred to as a "upstream side" or "upper part", and the side closer to the wheel cylinder CW (the side farther from the reservoir RV) is referred to as a "downstream side" or "lower part".

The front wheel system of the fluid passages of two systems is connected to the front wheel cylinders CWi and CWj (also described as "CWf"). The rear wheel system of the fluid passages of two systems is connected to the rear wheel cylinders CWk and CWl (also described as "CWr"). That is, a so-called front-rear type (also referred to as "H type") is adopted for the fluid passages of two systems.

The vehicle is a hybrid vehicle or an electric vehicle, including an electric motor GN for driving. The electric motor GN for driving also functions as a generator (power generator) for energy regeneration. For example, the driving motor GN is provided on the front wheel WHf. In the brake control device SC, so-called regenerative cooperative control (cooperation between regenerative braking and friction braking) is executed. The vehicle including the brake control device SC includes a brake operation member BP, a wheel cylinder CW, a reservoir RV, and a wheel speed sensor VW.

The brake operation member (e.g., brake pedal) BP is a member operated by the driver to decelerate the vehicle. The braking torque of the wheel WH is adjusted, and the braking force is generated at the wheel WH by operating the brake operation member BP. Specifically, a rotating member (e.g., brake disc) KT is fixed to the wheel WH of the vehicle. The brake caliper is arranged so as to sandwich the rotating member KT.

The brake caliper is provided with the wheel cylinder CW. As the pressure (brake liquid pressure) Pw of the brake liquid BF in the wheel cylinder CW is increased, the friction member (e.g., brake pad) is pressed against the rotating member KT. Since the rotating member KT and the wheel WH are fixed to rotate integrally, a braking torque (friction braking force) is generated at the wheel WH by the frictional force generated at this time.

The reservoir (atmospheric pressure reservoir) RV is a tank for the working liquid, in which the brake liquid BF is stored. The inside of the atmospheric pressure reservoir RV is partitioned into two parts Ru and Rd by a partition plate SK. A master reservoir chamber Ru is connected to a master cylinder chamber Rm. Furthermore, a pressure adjusting reservoir chamber Rd is connected to a pressure adjusting unit YC by a first reservoir fluid passage HR. When the reservoir RV is filled with the brake liquid BF, the liquid level of the brake liquid BF is above the height of the partition plate SK. For this reason, the brake liquid BF can freely move between the master reservoir chamber Ru and the pressure adjusting reservoir chamber Rd beyond the partition plate SK. On the other hand, when the amount of the brake liquid BF in the reservoir RV decreases and the liquid level of the brake liquid BF becomes lower than the height of the partition plate SK, the master reservoir chamber Ru and the pressure adjusting reservoir chamber Rd become independent reservoirs.

Each wheel WH includes a wheel speed sensor VW to detect a wheel speed Vw. The signal of the wheel speed Vw is used for anti-skid control or the like for suppressing the lock tendency (excessive deceleration slip) of the wheel WH. Each wheel speed Vw detected by the wheel speed sensor VW is input to a lower controller ECL. The controller ECL calculates a vehicle speed Vx based on the wheel speed Vw.

Brake Control Device SC

The brake control device SC includes an upper fluid unit YU on the side closer to the master cylinder CM and a lower fluid unit YL on the side closer to the wheel cylinder CW. The upper fluid unit YU is a fluid unit controlled by an upper controller ECU and included in the brake control device SC.

The upper fluid unit YU includes an operation amount sensor BA, an operation switch ST, a master unit YM, a pressure adjusting unit YC, a regenerative cooperation unit YK, and the upper controller ECU.

The operation amount sensor BA is provided on the brake operation member BP. An operation amount Ba of the brake operation member (brake pedal) BP by the driver is detected by the operation amount sensor BA. An operation displacement sensor SP is provided as the operation amount sensor BA so as to detect an operation displacement Sp of the brake operation member BP. Furthermore, an operation force sensor FP for detecting an operation force Fp of the brake operation member BP may be provided. Moreover, a simulator liquid pressure sensor PS is provided as the operation amount sensor BA so as to detect a liquid pressure (simulator liquid pressure) Ps in a stroke simulator SS. Therefore, at least one of the simulator liquid pressure Ps, the braking operation displacement Sp, and the braking operation force Fp is detected as a brake operation amount Ba. The brake operation amount Ba is an instruction signal for vehicle deceleration and is input to the upper controller ECU.

The operation switch ST is provided on the brake operation member BP. The operation switch ST detects whether the driver is operating the brake operation member BP. When the brake operation member BP is not being operated (that is, at the time of non-braking), the braking operation switch ST outputs an OFF signal as the operation signal St. On the other hand, when the brake operation member BP is being operated (that is, at the time of braking), an ON signal is output as the operation signal St. The braking operation signal St is input to the controller ECU.

Master Unit YM

The master unit YM adjusts the liquid pressure (front wheel brake liquid pressure) Pwf in the front wheel cylinder CWf through the master chamber Rm. The master unit YM is formed to include a master cylinder CM, a master piston PM, and a master elastic body SM.

The master cylinder CM is a cylinder member having a bottom portion. The master piston PM is a piston member inserted inside the master cylinder CM, and is movable in conjunction with the operation of the brake operation member BP. The inside of the master cylinder CM is partitioned into three chambers (liquid pressure chambers) Rm, Rs, and Ro by the master piston PM.

A groove portion is formed in a first inner peripheral portion Mc of the master cylinder CM, and two seals SL are fitted into the groove portion. An outer peripheral portion (outer peripheral cylindrical surface) Mp of the master piston PM and the first inner peripheral portion (inner peripheral cylindrical surface) Mc of the master cylinder CM are sealed by the two seals SL. The master piston PM is smoothly movable along the center axis Jm of the master cylinder CM.

The master cylinder chamber (simply referred to as the "master chamber") Rm is a liquid pressure chamber defined by the "first inner peripheral portion Mc and a first bottom portion (bottom surface) Mu of the master cylinder CM", and a first end My of the master piston PM. A master cylinder fluid passage HM is connected to the master chamber Rm, and is ultimately connected to the front wheel cylinder CWf through the lower fluid unit YL.

The master piston PM is provided with a flange portion (flange) Tm. The inside of the master cylinder CM is partitioned by the flange portion Tm into a servo liquid pressure chamber (simply also referred to as "servo chamber") Rs and a rear liquid pressure chamber (simply also referred to as "rear chamber") Ro. A seal SL is provided on the outer peripheral portion of the flange portion Tm, and the flange portion Tm and a second inner peripheral portion Md of the master cylinder CM are sealed. The servo chamber Rs is a liquid pressure chamber defined by "the second inner peripheral portion Md and a second bottom portion (bottom surface) Mt of the master cylinder CM" and a first surface Ms of the flange portion Tm of the master piston PM. The master chamber Rm and the servo chamber Rs are arranged to face each other with the master piston PM (particularly, flange portion Tm) interposed therebetween. A front wheel pressure adjusting fluid passage HCf is connected to the servo chamber Rs, and an adjusted liquid pressure Pc is introduced from the pressure adjusting unit YC.

The rear chamber (rear liquid pressure chamber) Ro is a liquid pressure chamber defined by the second inner peripheral portion Md of the master cylinder CM, a stepped portion Mz, and a second surface Mo of the flange portion Tm of the master piston PM. The rear liquid pressure chamber Ro is located between the master liquid pressure chamber Rm and the servo liquid pressure chamber Rs in the direction of the center axis Jm. A simulator fluid passage HS is connected to the rear chamber Ro. The amount of the brake liquid BF in the upper fluid unit YU is adjusted by the rear chamber Ro.

The first end Mv of the master piston PM is provided with a depression Mx. A master elastic body (e.g., compression spring) SM is provided between the depression Mx and the first bottom portion Mu of the master cylinder CM. The master elastic body SM presses the master piston PM against the second bottom portion Mt of the master cylinder CM in the direction of the center axis Jm of the master cylinder CM. At the time of non-braking, a stepped portion My of the master piston PM is abutted against the second bottom portion Mt of the master cylinder CM. The position of the master piston PM in this state is referred to as "the initial position of the master unit YM".

A through hole Ac is provided in the master cylinder CM between two seals SL (e.g., cup seal). The through hole Ac is connected to the master reservoir chamber Ru through a supply fluid passage HU. Furthermore, a through hole Ap is provided near the first end Mv of the master piston PM. When the master piston PM is at the initial position, the master chamber Rm is in a communicating state with the reservoir RV (particularly, the master reservoir chamber Ru) through the through holes Ac and Ap and the supply fluid passage HU.

The master chamber Rm applies, to the master piston PM, a biasing force Fb (referred to as "retreating force") in the retreating direction Hb along the center axis Jm by its internal pressure ("master cylinder liquid pressure", also referred to as "master liquid pressure") Pm. The servo chamber (servo liquid pressure chamber) Rs applies, to the master piston PM, a biasing force Fa (referred to as an "advancing force") opposing the retreating force Fb by its internal pressure (i.e., the introduced adjusted liquid pressure Pc). That is, in the master piston PM, the advancing force Fa by the liquid pressure Pv (=Pc) in the servo chamber Rs and the retreating force Fb by the liquid pressure (master liquid pressure) Pm in the master chamber Rm oppose each other (face each other) in the direction of the center axis Jm, and are statically balanced.

For example, a pressure receiving area of the first surface Ms of the flange portion Tm (i.e., a pressure receiving area of the servo chamber Rs) rs is set to be equal to a pressure receiving area of the first end My of the master piston PM (i.e., a pressure receiving area of the master chamber Rm) rm. In this case, the liquid pressure Pc introduced into the servo chamber Rs (as a result, the servo liquid pressure Pv) and the liquid pressure Pm in the master chamber Rm are the same in a steady state. At this time, the advancing force Fa (=Pc×rs) and the retreating force Fb (=Pm×rm (+SM elastic force)) are balanced.

When the brake operation member BP is operated, the adjusted liquid pressure Pc is increased by the pressure adjusting unit YC. The adjusted liquid pressure Pc is supplied into the servo chamber Rs, and the liquid pressure (servo liquid pressure) Pv in the servo chamber Rs is increased. When the force Fa in the advancing direction (leftward direction in the figure) Ha generated by the servo liquid pressure Pv becomes larger than the set load of the master elastic body SM, the master piston PM is moved along the center axis Jm. When the through hole Ap passes through the seal SL due to the movement in the advancing direction Ha, the master chamber Rm is shut off from the reservoir RV (in particular, the master reservoir chamber Ru). Furthermore, when the adjusted liquid pressure Pc increases, the volume of the master chamber Rm decreases, and the brake liquid BF is sent from the master cylinder CM toward the front wheel cylinder CWf at the master liquid pressure Pm. A force (retreating force) Fb in the retreating direction Hb acts on the master piston PM by the master liquid pressure Pm (=Pwf). The servo chamber Rs generates a force (advancing force) Fa in the advancing direction Ha by the servo liquid pressure Pv (=Pc) so as to counteract (oppose) the retreating force Fb. The master liquid pressure Pm is thus increased or decreased depending on the increase or decrease of the adjusted liquid pressure Pc.

When the brake operation member BP is returned, the adjusted liquid pressure Pc is reduced by the pressure adjusting unit YC. Then, the servo liquid pressure Pv becomes smaller than the master chamber liquid pressure Pm (=Pwf), and the master piston PM is moved in the retreating direction (rightward in the drawing) Hb. When the brake operation member BP is in the non-operated state, the elastic force of the compression spring SM causes the master piston PM (particularly, the stepped portion My) to return to the position (initial position) where it come into contact with the second bottom portion Mt of the master cylinder CM.

Pressure Adjusting Unit YC

The liquid pressure Pm in the master chamber Rm and the liquid pressure (rear wheel brake liquid pressure) Pwr in the rear wheel cylinder CWrs are adjusted by the pressure adjusting unit YC. The pressure adjusting unit YC includes an electric pump DC, a pressure adjusting fluid passage HC, a check valve GC, an electromagnetic valve UC, and an adjusted liquid pressure sensor PC. In the pressure adjusting unit YC, the brake liquid BF discharged from the electric pump DC is adjusted to the adjusted liquid pressure Pc by the electromagnetic valve UC. The adjusted liquid pressure Pc is applied to the master unit YM (particularly, the servo chamber Rs) and the rear wheel cylinder CWr.

The pressure adjusting electric pump DC includes a set of one pressure adjusting electric motor MC and one pressure adjusting fluid pump QC. In the electric pump DC, the electric motor MC and the fluid pump QC are fixed such that the electric motor MC and the fluid pump QC rotate integrally. The pressure adjusting electric pump DC (particularly, the pressure adjusting electric motor MC) is a power source for adjusting the liquid pressure (brake liquid pressure) Pw of the wheel cylinder CW at the time of control braking. The pressure adjusting electric motor MC is controlled by the upper controller ECU based on the drive signal Mc.

For example, a three-phase brushless motor is employed as the electric motor MC. The brushless motor MC is provided with a rotation angle sensor KA that detects a rotor position (rotation angle) Ka. A switching element of a bridge circuit is controlled based on the rotation angle (actual value) Ka, and the electric motor MC is driven. The direction of the energization amount of the coil of each of the three phases (U phase, V phase, W phase) (i.e., excitation direction) is sequentially switched, and the brushless motor MC is rotationally driven.

The first reservoir fluid passage HR is connected to a suction port Qs of the pressure adjusting fluid pump QC. Furthermore, the pressure adjusting fluid passage HC is connected to a discharge port Qt of the fluid pump QC. By driving the electric pump DC (particularly, the fluid pump QC), the brake liquid BF is suctioned from the first reservoir fluid passage HR through the suction port Qs, and discharged from the discharge port Qt to the pressure adjusting fluid passage HC. For example, a gear pump is employed as the adjustment fluid pump QC.

A check valve GC is interposed in the pressure adjusting fluid passage HC. For example, the check valve GC is provided near the discharge portion Qt of the fluid pump QC. The check valve GC allows the brake liquid BF to move from the first reservoir fluid passage HR to the pressure adjusting fluid passage HC, but the movement from the pressure adjusting fluid passage HC to the first reservoir fluid passage HR (i.e., backflow of the brake liquid BF) is inhibited. That is, the electric pump DC is rotated only in one direction.

The electromagnetic valve UC is connected to the pressure adjusting fluid passage HC and the first reservoir fluid passage HR. The pressure adjusting electromagnetic valve UC is a linear type electromagnetic valve (also referred to as "proportional valve" or "differential pressure valve") in which a valve opening amount (lift amount) is continuously controlled based on an energized state (e.g., supply current). The pressure adjusting electromagnetic valve UC is controlled by the upper controller ECU based on a drive signal Uc. As the electromagnetic valve UC, a normally-open type electromagnetic valve is employed.

The brake liquid BF is pumped from the first reservoir fluid passage HR through the suction port Qs of the fluid pump QC, and is discharged from the discharge port Qt. Then, the brake liquid BF is returned to the first reservoir fluid passage HR through the check valve GC and the electromagnetic valve UC. In other words, a reflux path (a fluid passage in which the flow of the brake liquid BF again returns to the original flow) is formed by the first reservoir fluid passage HR and the pressure adjusting fluid passage HC, and the check valve GC and the electromagnetic valve UC are interposed in the reflux path.

When the electric pump DC is operating, the brake liquid BF is refluxed in the order of "HR→QC (Qs→Qt)→GC→UC→HR" as shown by a broken arrow (A). When the pressure adjusting electromagnetic valve UC is in a fully open state (at the time of non-energization because it is a normally-open type), the liquid pressure (adjusted liquid pressure) Pc in the pressure adjusting fluid passage HC is low, and is approximately "0 (atmospheric pressure)". When the energization amount to the pressure adjusting electromagnetic valve UC is increased and the reflux path is narrowed by the electromagnetic valve UC, the adjusted liquid pressure Pc is increased. An adjusted liquid pressure sensor PC is provided in the pressure adjusting fluid passage HC (particularly, between the check valve GC and the electromagnetic valve UC) so as to detect the adjusted liquid pressure Pc.

In the pressure adjusting unit YC, the pressure adjusting electric pump DC is rotationally driven based on the brake operation amount Ba and a preset characteristic (calculation map). Then, based on the detection result (adjusted liquid pressure Pc) of the adjusted liquid pressure sensor PC, the pressure adjusting electromagnetic valve UC is controlled, and the liquid pressure Pc in the pressure adjusting fluid passage HC is adjusted. Specifically, the rotation number Na of the pressure adjusting electric pump DC (particularly, the pressure adjusting electric motor MC) is controlled so that the target liquid pressure Pt is achieved, and the flow (flow rate) of the brake liquid BF from the electric pump DC (particularly, the fluid pump QC) is generated. The flow of the brake liquid BF is narrowed by the pressure adjusting electromagnetic valve UC, and eventually, the target liquid pressure Pt is achieved. That is, the adjusted liquid pressure Pc is adjusted by an orifice effect of the pressure adjusting electromagnetic valve UC.

The pressure adjusting fluid passage HC is branched (divided) at a branch portion Bn into a front wheel pressure adjusting fluid passage HCf and a rear wheel pressure adjusting fluid passage HCr. The front wheel pressure adjusting fluid passage HCf is connected to the servo chamber Rs, and the adjusted liquid pressure Pc is introduced to the servo chamber Rs. Furthermore, the rear wheel pressure adjusting fluid passage HCr is connected to the lower fluid unit YL, and is ultimately connected to the rear wheel cylinders CWr (CWk, CWl). Therefore, the adjusted liquid pressure Pc is introduced (supplied) to the rear wheel cylinders CWr. The liquid pressure Pwr of the rear wheel cylinders CWr is directly controlled by the pressure adjusting unit YC without passing through the master cylinder CM. Thus, the dimension of the master cylinder CM in the direction of the center axis Jm can be reduced.

Regenerative Cooperation Unit YK

The cooperative control of the friction braking and the regenerative braking is achieved by the regenerative cooperation unit YK. That is, a state in which the brake operation member BP is operated but the brake liquid pressure Pw is not generated can be formed by the regenerative cooperation unit YK. The regenerative cooperation unit YK includes an input cylinder CN, an input piston PN, an input elastic body SN, a first switching valve VA, a second switching valve VB, a stroke simulator SS, and a simulator liquid pressure sensor PS.

The input cylinder CN is a cylinder member having a bottom portion fixed to the master cylinder CM. The input piston PN is a piston member inserted inside the input cylinder CN. The input piston PN is mechanically connected to the brake operation member BP through a clevis (U-shaped link) so as to cooperatively operate with the brake operation member BP. The input piston PN is provided with a flange portion (flange) Tn. An input elastic body (e.g., compression spring) SN is provided between the mounting surface of the input cylinder CN to the master cylinder CM and the flange portion Tn of the input piston PN. The input elastic body SN presses the flange portion Tn of the input piston PN against the bottom portion of the input cylinder CN in the direction of the center axis Jm.

At the time of non-braking, the stepped portion My of the master piston PM is abutted against the second bottom portion Mt of the master cylinder CM, and the flange portion Tn of the input piston PN is abutted against the bottom portion of the input cylinder CN. At the time of non-braking, a gap Ks between the master piston PM (particularly, an end face Mq) and the input piston PN (particularly, an end face Rv) is set to a predetermined distance ks (referred to as an "initial gap") inside the input cylinder CN. That is, when the pistons PM and PN are at the positions in the most retreating direction Hb (referred to as "initial positions" of the respective pistons) (i.e., at the time of non-braking), the master piston PM and the input piston PN are separated by a predetermined distance ks. Here, the predetermined distance ks corresponds to the maximum value of a regeneration amount Rg. When the regenerative cooperative control is executed, the gap (also referred to as "separation displacement") Ks is controlled (adjusted) by the adjusted liquid pressure Pc.

A diameter dm of the master piston PM (end Mq) in the input cylinder CN is set to be equal to a diameter dn of the input piston PN that enters the input cylinder CN when the brake operation member BP is operated. In other words, a cross-sectional area am based on the diameter dm and a cross-sectional area an based on the diameter dn match. As will be described later, the manual braking is realized by fluid-locking the inside of the input cylinder CN. When manual braking is performed, since "dm=dn (am=an)", the intrusion volume of the input piston PN into the input cylinder CN matches the retreat volume of the master piston PM out of the input cylinder CN, and each piston PN, PM is moved in the advancing direction Ha. That is, a displacement Hn of the input piston PN matches a displacement Hm of the master piston PM, and the force Fn applied to the input piston PN by the driver is used as it is as the force Fm acting on the master piston PM (i.e., "Hn=Hm, Fn=Fm").

The input cylinder CN is connected to the reservoir RV (particularly, the pressure adjusting reservoir chamber Rd) through a second reservoir fluid passage HT. A part of the second reservoir fluid passage HT can be shared with the first reservoir fluid passage HR. However, it is desirable that the first reservoir fluid passage HR and the second reservoir fluid passage HT are desirably separately connected to the reservoir RV. The fluid pump QC suctions the brake liquid BF from the reservoir RV through the first reservoir fluid passage HR, but at this time, bubbles may be mixed in the first reservoir fluid passage HR. Thus, the second reservoir fluid passage HT does not have a common portion with the first reservoir fluid passage HR and is connected to the reservoir RV separately from the first reservoir fluid passage HR so as to avoid air bubbles from being mixed into the input cylinder CN and the like.

In the second reservoir fluid passage HT, two switching valves VA and VB are provided in series. The first and second switching valves VA and VB are two-position electromagnetic valves (also referred to as "on/off valves") having an open position (communicated state) and a closed position (shut-off state). The first and second switching valves VA and VB are controlled by the upper controller ECU based on drive signals Va and Vb. A normally-closed type electromagnetic valve is employed as the first switching valve VA, and a normally-open type electromagnetic valve is employed as the second switching valve VB.

The second reservoir fluid passage HT is connected to the simulator fluid passage HS at a connecting portion Bs between the first switching valve VA and the second switching valve VB. In other words, one end of the simulator fluid passage HS is connected to the rear chamber Ro, and the other end is connected to a part Bs. The simulator fluid passage HS is provided with the stroke simulator (also simply referred to as "simulator") SS. When the regenerative cooperative control is executed by the simulator SS, and the first switching valve VA is at the open position and the second switching valve VB is at the closed position, the operation force Fp of the brake operation member BP is generated. A piston and an elastic body (e.g., compression spring) are provided inside the simulator SS. The brake liquid BF is moved from the input cylinder CN to the simulator SS, and the piston is pushed by the brake liquid BF flowing in. A force is exerted on the piston in a direction of inhibiting the inflow of the brake liquid BF by the elastic body. The elastic body forms an operation force Fp when the brake operation member BP is operated.

The simulator liquid pressure sensor PS is provided in the simulator fluid passage HS so as to detect the liquid pressure (simulator liquid pressure) Ps in the simulator SS. The simulator liquid pressure sensor PS is one of the above-described brake operation amount sensors BA. The detected simulator liquid pressure Ps is input to the controller ECU as the brake operation amount Ba.

The cross-sectional area am of the end Mq of the master piston PM is set to be equal to the area ao of the second surface Mo of the flange portion Tm so that a volume change accompanying the movement of the master piston PM is absorbed. When the regenerative cooperative control is executed, the first switching valve VA is at the open position and the second switching valve VB is at the closed position, and hence the input chamber Rn and the rear chamber Ro are connected by the second reservoir fluid passage HT and the simulator fluid passage HS. When the master piston PM is moved in the advancing direction Ha, the volume in the input chamber Rn is increased by the movement amount, but since "am=ao", the brake liquid BF corresponding to the increase in volume are all moved from the rear chamber Ro to the input chamber Rn. In other words, there is no excess or deficiency in the balance of the liquid amount accompanying the movement of the master piston PM. Therefore, the amount (volume) of the brake liquid BF flowing into the simulator SS or out of the simulator SS depends only on the movement of the input piston PN.

Upper Controller ECU

The upper controller (also referred to as "electronic control unit") ECU includes an electric circuit substrate on which a microprocessor MP or the like is mounted and a control algorithm programmed in the microprocessor MP. The electric motor MC and three types of different electromagnetic valves VA, VB, and UC are controlled based on the brake operation amount Ba, the operation signal St, the adjusted liquid pressure Pc by the upper controller ECU. Specifically, the drive signals Va, Vb, and Uc for controlling various electromagnetic valves VA, VB, and UC are calculated based on the control algorithm in the microprocessor MP. Similarly, the drive signal Mc for controlling the electric motor MC is calculated. The electromagnetic valves VA, VB, and UC and the electric motor MC are driven based on these drive signals Va, Vb, Uc, and Mc.

The upper controller ECU is network-connected to the lower controller ECL and the controller (electronic control unit) of another system through an in-vehicle communication bus BS. The regeneration amount Rg (target value) is transmitted from the upper controller ECU to a driving controller ECD through the communication bus BS so as to execute regenerative cooperative control. The "regeneration amount Rg" is a state quantity (target value) representing the magnitude of the regenerative braking generated by the driving motor (also referred to as regenerative generator) GN. The regenerative braking is generated by controlling the regenerative generator GN by the driving controller ECD based on the target value Rg of the regeneration amount. Power is supplied from a generator AL mounted on the vehicle and a storage battery BT to each controller ECU, ECL, and ECD.

The upper controller ECU includes a drive circuit DR to drive the electromagnetic valves VA, VB, and UC, and the electric motor MC. In the drive circuit DR, a bridge circuit is formed by switching elements (power semiconductor devices such as MOS-FET and IGBT) to drive the electric motor MC. Based on the motor drive signal Mc, the energized state of each switching element is controlled and the output of the electric motor MC is controlled. Furthermore, in the drive circuit DR, the energized states (i.e., excitation state) are controlled based on the drive signals Va, Vb, and Uc so as to drive the electromagnetic valves VA, VB, and UC. The drive circuit DR includes an electric motor MC and an energization amount sensor for detecting actual energization amounts of the electromagnetic valves VA, VB, and UC. For example, a current sensor is provided as an energization amount sensor, and a supply current to the electric motor MC and the electromagnetic valves VA, VB, and UC is detected.

At the time of no-braking (e.g., when the brake operation member BP is not operated), the electric motor MC and the electromagnetic valves VA, VB, and UC are not energized. Therefore, the electric motor MC is stopped, the first switching valve VA is at the closed position, the second switching valve VB is at the open position, and the pressure adjusting valve UC is at the open position.

At the time of control braking when the brake control device SC is in a state of performing appropriate operation, first, the controller ECU energizes the first and second switching valves VA and VB, and the first switching valve VA is at the open position and the second switching valve VB is at the closed position. The input chamber Rn and the rear chamber Ro are fluidly connected, and the simulator SS is connected to the input chamber Rn depending on the open position of the first switching valve VA. Furthermore, the connection between the simulator SS and the reservoir RV is shut off by the closed position of the second switching valve VB. The input piston PN is moved in the advancing direction Ha by the operation of the brake operation member BP, and the movement causes the liquid amount flowing out from the input chamber Rn to flow into the simulator SS, thus forming the operation force Fp of the brake operation member BP.

At the time of control braking, the controller ECU controls the electric pump DC (particularly, the electric motor MC) and the electromagnetic valve UC based on the operation amount Ba. Specifically, the brake liquid BF is pumped from the reservoir RV through the first reservoir fluid passage HR by the electric pump DC, and discharged to the pressure adjusting fluid passage HC. Then, the discharged brake liquid BF is narrowed by the electromagnetic valve UC and adjusted to the adjusted liquid pressure Pc. The adjusted liquid pressure Pc is supplied to the servo chamber Rs through the front wheel pressure adjusting fluid passage HCf. The master piston PM is moved in the advancing direction Ha by the adjusted liquid pressure Pc, and the brake liquid BF is sent from the master chamber Rm toward the front wheel cylinders CWf (CWi, CWj). When the pressure receiving area rs of the servo chamber Rs is equal to the pressure receiving area rm of the master chamber Rm, the master liquid pressure Pm equal to the adjusted liquid pressure Pc is applied to the front wheel cylinders CWf. Furthermore, the adjusted liquid pressure Pc is introduced into the rear wheel cylinders CWr (CWk, CWl) through the rear wheel pressure adjusting fluid passage HCr.

At the time of manual braking when the operation of the brake control device SC is in a malfunction state, the first and second switching valves VA and VB are not energized. Therefore, the first switching valve VA is at the closed position, and the second switching valve VB is at the open position. The input chamber Rn is in a fluid locked state (sealed state) by the closed position of the first switching valve VA, so that the input piston PN and the master piston PM cannot be relatively moved. Moreover, the rear chamber Ro is fluidly connected to the reservoir RV through the second reservoir fluid passage HT by the open position of the second switching valve VB. Therefore, the capacity of the rear chamber Ro is reduced by the movement of the master piston PM in the advancing direction Ha, but the liquid amount accompanying the capacity reduction is discharged toward the reservoir RV. In conjunction with the operation of the brake operation member BP, the input piston PN and the master piston PM are integrally moved and the brake liquid BF is sent from the master chamber Rm.

Lower Fluid Unit YL

The lower fluid unit YL is controlled by the lower controller ECL. The wheel speed Vw, a yaw rate Yr, a steering angle Sa, a longitudinal acceleration Gx, a lateral acceleration Gy, and the like are input to the lower controller ECL. For example, in the lower fluid unit YL, anti-skid control is executed based on the wheel speed Vw so as to suppress excessive deceleration slip of the wheel WH (e.g., wheel lock). Furthermore, vehicle stabilization control (so-called ESC) for suppressing excessive oversteer behavior and understeer behavior of the vehicle is performed based on the yaw rate Yr. That is, in the lower fluid unit YL, braking control independent for each wheel is executed based on the signal (Vw etc.).

In addition, in the lower fluid unit YL, in the regenerative cooperative control, control for further adjusting the adjusted liquid pressure Pc is performed so that the front wheel system and the rear wheel system are independently controlled. The upper controller ECU and the lower controller ECL are connected in a communicable state by the communication bus BS, and share a sensor signal and a calculated value. The upper fluid unit YU and the lower fluid unit YL are connected through the master cylinder fluid passage HM and the rear wheel pressure adjusting fluid passage HCr.

The lower fluid unit YL includes a lower electric pump DL, "front wheel and rear wheel low-pressure reservoirs RLf and RLr", "front wheel and rear wheel charge over valves UPf and UPr", "front wheel and rear wheel input liquid pressure sensors PQf and PQr", "front wheel and rear wheel output liquid pressure sensors PPf, PPr", "inlet valve VI", and "outlet valve VO".

The lower electric pump DL includes one lower electric motor ML and two lower fluid pumps QLf and QLr. The lower electric motor ML is controlled by the lower controller ECL based on the drive signal Ml. The two lower fluid pumps QLf and QLr are integrally rotated and driven by the electric motor ML. The front wheel and rear wheel fluid pumps QLf and QLr of the electric pump DL pump the brake liquid BF from upstream portions Bof and Bor of the front wheel and rear wheel charge over valves (also simply referred to as "charge valves") UPf and UPr and discharge the brake liquid BF to downstream portions Bpf and Bpr of the front wheel and rear wheel charge valves UPf and UPr. The front wheel and rear wheel low-pressure reservoirs RLf and RLr are provided on the suction side of the front wheel and rear wheel fluid pumps QLf and QLr.

Similarly to the linear pressure adjusting valve UC, a normally-open type linear pressure adjusting valve (an electromagnetic valve in which the valve opening amount is continuously controlled depending on the energized state) is employed as the charge valve UP (generic name for UPf and UPr). The linear pressure adjusting valve UP is controlled by the lower controller ECL based on the drive signal Up (Upf, Upr).

When the front wheel fluid pump QLf is driven, a reflux (flow of the circulating brake liquid BF) of "Bof→RLf→QLf→Bpf→UPf→Bof" is formed. The liquid pressure (front wheel output liquid pressure) Ppf of the downstream portion of the front wheel charge valve UPf is adjusted by the front wheel charge valve UPf provided in the master cylinder fluid passage HM. The brake liquid BF is moved from the upstream portion Bof to the downstream portion Bpf of the front wheel charge valve UPf by the fluid pump QLf, and the differential pressure (Ppf>Pqf) between the input liquid pressure Pqf of the upstream portion and the output liquid pressure Ppf of the downstream portion is adjusted by the front wheel charge valve UPf (throttle of the valve opening portion).

Similarly, when the rear wheel fluid pump QLr is driven, a reflux of "Bor→RLr→QLr→Bpr→UPr→Bor" is formed. The liquid pressure (rear wheel output liquid pressure) Ppr of the downstream portion of the rear wheel charge valve UPr is adjusted by the rear wheel charge valve UPr provided in the rear wheel pressure adjusting fluid passage HCr. That is, the brake liquid BF is moved from the upper portion Bor to the lower portion Bpr of the rear wheel charge valve UPr by the fluid pump QLr, and the differential pressure (Ppr>Pqr) between the upper liquid pressure (input liquid pressure) Pqr and the lower liquid pressure (output liquid pressure) Ppr is adjusted by the rear wheel charge valve UPr.

The input liquid pressure sensors PQf and PQr are provided to detect the input liquid pressures Pqf and Pqr of the front and rear wheels. The output liquid pressure sensors PPf and PPr are provided to detect the output liquid pressures Ppf and Ppr of the front and rear wheels. The detected liquid pressure signals Pq and Pp are input to the lower controller ECL. Note that at least one of the four liquid pressure sensors PQf, PQr, PPf, and PPr can be omitted.

The master cylinder fluid passage HM is branched (divided) into each front wheel cylinder fluid passages HWi and HWj at a front wheel branch portion Bpf on the downstream side of the front wheel charge valve UPf. Similarly, the rear wheel pressure adjusting fluid passage HCr is branched into each rear wheel cylinder fluid passages HWk and HWl at a rear wheel branch portion Bpr on the downstream side of the rear wheel charge valve UPr.

The inlet valve VI and the outlet valve VO are provided in the wheel cylinder fluid passage HW. A normally-open type on/off electromagnetic valve is employed as the inlet valve VI. Furthermore, a normally-closed type on/off electromagnetic valve is employed as the outlet valve VO. The electromagnetic valves VI and VO are controlled by the lower controller ECL based on drive signals Vi and Vo. The brake liquid pressure Pw of each wheel can be independently controlled by the inlet valve VI and the outlet valve VO. When the inlet valve VI and the outlet valve VO are not driven, the front wheel brake liquid pressure Pwf (Pwi, Pwj) is the same as the front wheel output liquid pressure Ppf, and the rear wheel brake liquid pressure Pwr (Pwk, Pwl) is the same as the rear wheel output liquid pressure Ppr.

In the inlet valve VI and the outlet valve VO, the configuration relating to each wheel WH is the same, and thus the configuration relating to the right front wheel WHi will be described by way of an example. A normally-open type inlet valve VIi is interposed in the wheel cylinder fluid passage HWi for the right front wheel (fluid passage connecting the branch portion Bpf and the right front wheel cylinder CWi). The wheel cylinder fluid passage HWi is fluidly connected to the low-pressure reservoir RLf at a downstream portion of the inlet valve VIi through a normally-closed type outlet valve VOi. For example, in the anti-skid control, the inlet valve VIi is at the closed position and the outlet valve VOi is at the open position to reduce the liquid pressure Pwi in the wheel cylinder CWi. The inflow of the brake liquid BF from the inlet valve VIi is inhibited, the brake liquid BF in the wheel cylinder CWi flows out to the low-pressure reservoir RLf, and the brake liquid pressure Pwi is reduced. Furthermore, in order to increase the brake liquid pressure Pwi, the inlet valve VIi is set to the open position and the outlet valve VOi is set to the closed position. The outflow of the brake liquid BF to the low-pressure reservoir RLf is inhibited, the output liquid pressure Ppf through the front wheel charge valve UPf is introduced into the wheel cylinder CWi, and the right front wheel brake liquid pressure Pwi is increased.

Figure 2:
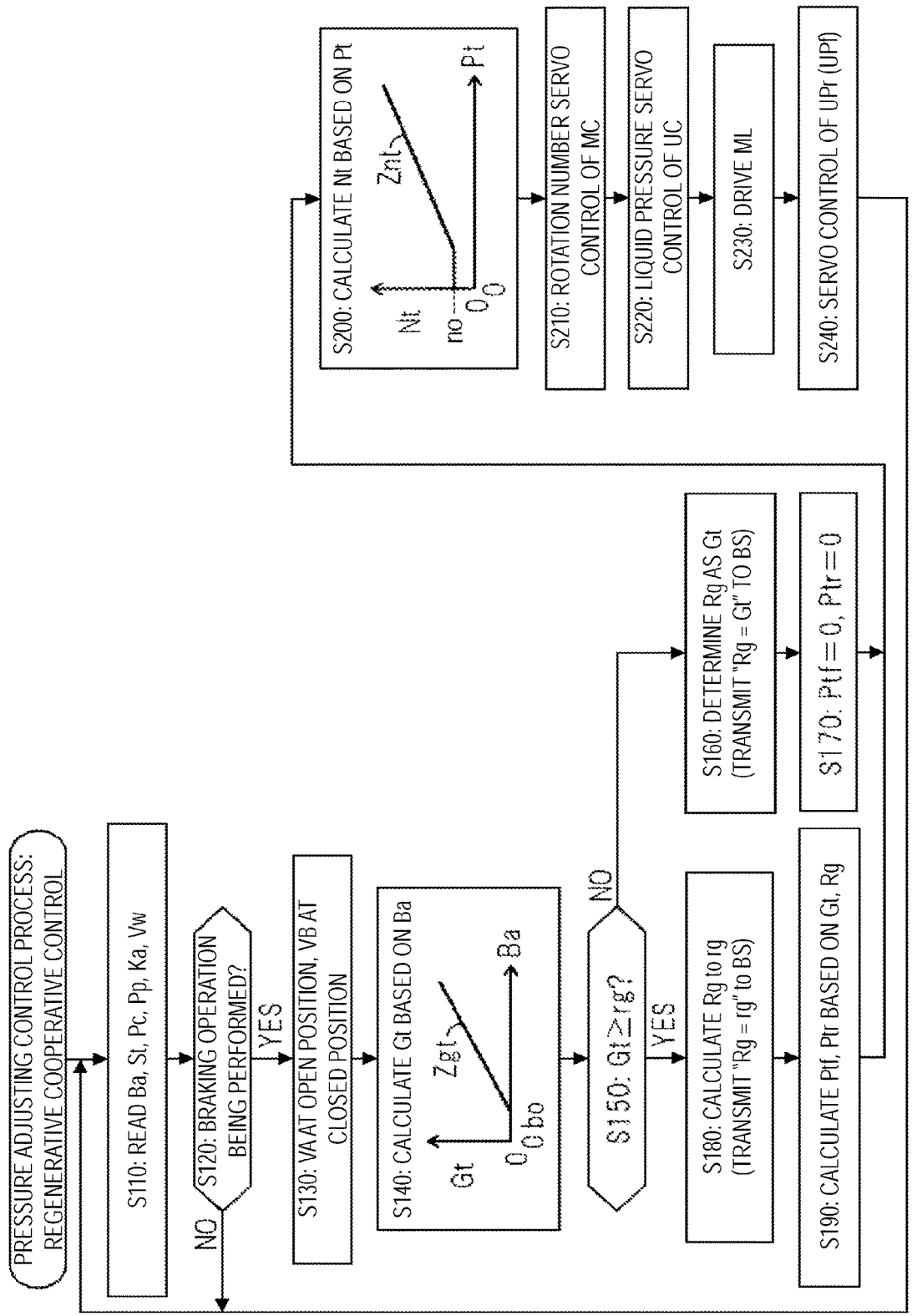
FIG. 2 is a control flowchart describing a process of pressure adjusting control including regenerative cooperative control.

Process of Pressure Adjusting Control Including Regenerative Cooperative Control With reference to the control flowchart of FIG. 2, a process of pressure adjusting control including regenerative cooperative control will be described. "Pressure adjusting control" is a drive control of the electric motors MC and ML and the electromagnetic valves UC and UP for adjusting the adjusted liquid pressure Pc and the output liquid pressure Pp. The control algorithm is programmed in the controller ECU.

In step S110, the brake operation amount Ba, the operation signal St, the adjusted liquid pressure Pc, the output liquid pressure Pp, the rotation angle Ka, and the wheel speed Vw are read. The operation amount Ba is detected by the operation amount sensor BA (e.g., simulator liquid pressure sensor PS, operation displacement sensor SP). The operation signal St is detected by the operation switch ST provided on the brake operation member BP. The adjusted liquid pressure Pc is detected by the adjusted liquid pressure sensor PC provided in the pressure adjusting fluid passage HC. The output liquid pressure Pp is detected by the output liquid pressure sensor PP, and the detected signal Pp is transmitted from the lower controller ECL through the communication bus BS. The motor rotation angle Ka is detected by the rotation angle sensor KA provided on the pressure adjusting electric motor MC. The wheel speed Vw is detected by the wheel speed sensor VW provided on each wheel WH.

In step S120, "whether or not braking operation is being performed" is determined based on at least one of the brake operation amount Ba and the brake operation signal St. For example, when the operation amount Ba is greater than or equal to a predetermined value bo, positive determination is made in step S120 and the process proceeds to step S130. On the other hand, when "Ba<bo", negative determination is made in step S120 and the process returns to step S110. Here, the predetermined value bo is a preset constant that corresponds to the play of the brake operation member BP. When the operation signal St is on, the process proceeds to step S130, and when the operation signal St is off, the process returns to step S110.

In step S130, the normally-closed type first switching valve VA is set to the open position, and the normally-open type second switching valve VB is set to the closed position. The input liquid pressure chamber Rn and the rear liquid pressure chamber Ro are thereby connected. Furthermore, the simulator SS is connected to the input chamber Rn and is shut off from the reservoir RV.

In step S140, a target deceleration Gt is calculated based on the operation amount Ba. The target deceleration Gt is a target value of the deceleration in decelerating the vehicle. According to the calculation map Zgt, the target deceleration Gt is determined to be "0" when the operation amount Ba is in the range from "0" to the predetermined value bo, and is calculated to monotonically increase from "0" as the operation amount Ba increases when the operation amount Ba is greater than or equal to the predetermined value bo.

In step S150, "whether or not the target deceleration Gt is greater than or equal to a predetermined regeneration amount rg" is determined based on the target deceleration Gt. The predetermined regeneration amount rg is a threshold for the vehicle deceleration that can be achieved by regenerative braking. For example, the predetermined regeneration amount rg is set in advance as a constant. Furthermore, the predetermined regeneration amount rg can be set based on the state of the regenerative generator GN or the storage battery BT. When "Gt<rg" and negative determination is made in step S140, the process proceeds to step S160. On the other hand, if "Gt>rg" is satisfied, the process proceeds to step S180.

In step S160, the regeneration amount Rg (value corresponding to the vehicle deceleration) is determined to match the target deceleration Gt. Then, "Rg=Gt" is transmitted from the upper controller ECU to the driving controller ECD through the communication bus BS. In step S170, the target liquid pressures Ptf and Ptr of the front and rear wheels are calculated to "0". That is, the target value of the adjusted liquid pressure Pc is determined to be "0". In this case, the vehicle deceleration does not employ friction braking, and the target deceleration Gt is achieved only by regenerative braking.

In step S180, the regeneration amount Rg corresponding to the vehicle deceleration is determined to match the predetermined regeneration amount rg. Then, "Rg=rg" is transmitted from the upper controller ECU to the driving controller ECD through the communication bus BS. That is, of the target deceleration Gt, the amount corresponding to the predetermined regeneration amount rg is achieved by regenerative braking (the braking force generated by the generator GN), and the remaining amount ("Gt-rg") is achieved by friction braking (the braking force generated by friction between the rotating member KT and the friction material). In step S190, the front wheel and rear wheel target liquid pressures Ptf and Ptr are determined based on the target deceleration Gt and the regeneration amount Rg (=rg). The method of calculating the front wheel target liquid pressure Ptf and the rear wheel target liquid pressure Ptr will be described later. Note that the target liquid pressure Pt (Ptf, Ptr) is a target value of the liquid pressure to be achieved by friction braking.

Hereinafter, a description will be given assuming a vehicle in which a driving motor (i.e., regenerative generator) GN is provided on the front wheel WHf. In step 200, the target rotation number Nt is calculated based on the target liquid pressure Pt (particularly, the front wheel brake liquid pressure Ptf). The target rotation number Nt is a target value of the rotation number of the electric motor MC. The target rotation number Nt is calculated so as to monotonically increase as the target liquid pressure Pt increases in accordance with the calculation map Znt. As described above, the adjusted liquid pressure Pc is generated by the orifice effect of the pressure adjusting electromagnetic valve UC. Since a flow rate of certain extent is required to obtain the orifice effect, a predetermined lower limit rotation number no is provided for the target rotation number Nt. The lower limit rotation number no is a minimum required value (a preset constant) in the generation of liquid pressure. The target rotation number Nt may be directly calculated based on the brake operation amount Ba. In any case, the target rotation number Nt is determined based on the brake operation amount Ba.

In step S210, in the electric motor MC, servo control based on the rotation number (control for causing the actual value to quickly follow the target value) is executed. For example, as the rotation number servo control, the rotation number feedback control of the pressure adjusting electric motor MC is executed based on the target rotation number Nt and the actual rotation number Na. In step S210, the rotation angle Ka is time-differentiated based on the motor rotation angle (detection value) Ka, and the motor rotation speed (actual rotation number per unit time) Na is calculated. Then, the rotation number of the electric motor MC is used as a control variable, and the energization amount (e.g., supply current) to the electric motor MC is controlled. Specifically, based on a deviation hN(=Nt−Na) between the target value Nt and the actual value Na of the rotation number, the energization amount to the electric motor MC is finely adjusted so that the rotation number deviation hN becomes "0" (that is, the actual value Na approaches the target value Nt). When "hN>nx", the energization amount to the electric motor MC is increased, and the speed of the electric motor MC is increased. On the other hand, when "hN<−nx", the energization amount to the electric motor MC is reduced, and the speed of the electric motor MC is decreased. Here, the predetermined value nx is a preset constant.

In step S220, the servo control based on the liquid pressure is performed in the electromagnetic valve UC. For example, as the liquid pressure servo control, liquid pressure feedback control of the pressure adjusting electromagnetic valve UC is executed based on the front wheel target liquid pressure Ptf and the adjusted liquid pressure Pc. In the feedback control, the pressure Pc of the brake liquid BF in the pressure adjusting fluid passage HC is used as a control variable, and the energization amount to the normally-open linear type electromagnetic valve UC is controlled. Based on a deviation hP (=Ptf−Pc) between the front wheel target liquid pressure Ptf and the adjusted liquid pressure Pc, the energization amount to the electromagnetic valve UC is adjusted so that the liquid pressure deviation hP approaches "0" (i.e., the adjusted liquid pressure Pc approaches the front wheel target liquid pressure Ptf). When "hP>px", the energization amount to the electromagnetic valve UC is increased, and the valve opening amount of the electromagnetic valve UC is decreased. On the other hand, when "hP<−px", the energization amount to the electromagnetic valve UC is decreased, and the valve opening amount of the electromagnetic valve UC is increased. Here, the predetermined value px is a preset constant.

In step S230, the lower electric motor ML is driven by the lower controller ECL, and the brake liquid BF is discharged from the upstream side to the downstream side of the charge valve UP by the lower fluid pump QL. When the charge valve UP is at the open position and the reflux path including the fluid pump QL is not narrowed, the upstream liquid pressure (master liquid pressure) Pm and the lower liquid pressure Ppf of the front wheel charge valve UPf substantially match in the front wheel braking system. In the rear wheel braking system, the upstream liquid pressure (adjusted liquid pressure) Pc and the lower liquid pressure (output liquid pressure) Ppr of the rear wheel charge valve UPr are substantially equal.

A regenerative braking force acts on the front wheel WHf. The friction braking force is adjusted so that the distribution of the braking force between the front and rear wheels is optimized. In step S240, the servo control based on liquid pressure (liquid pressure servo control) is executed in the rear wheel charge valve UPr. Specifically, the liquid pressure feedback control of the rear wheel charge valve UPr is executed such that the rear wheel output liquid pressure Ppr is increased from the adjusted liquid pressure Pc (=Pqr) and adjusted by the lower fluid unit YL. Specifically, a deviation hQ between the rear wheel target liquid pressure Ptr and the rear wheel output liquid pressure Ppr (the detection value of the rear wheel output liquid pressure sensor PPr) is calculated. Then, based on the liquid pressure deviation hQ, the energization amount to the rear wheel charge valve UPr is adjusted so that the liquid pressure deviation hQ becomes "0" and the rear wheel output liquid pressure Ppr approaches the rear wheel target liquid pressure Ptr.

When the rear wheel output liquid pressure sensor PPr is omitted, in the control of the rear wheel charge valve UPr, the deceleration slip of the wheel (also simply referred to as "wheel slip") Sw is used as a state variable, and the slip servo control is executed. The servo control based on the wheel slip Sw is based on the fact that when the deceleration slip Sw of the wheel is not excessively large (i.e., when the wheel slip Sw is within a predetermined range), the wheel slip Sw and the wheel braking force are in a proportional relationship. For example, the vehicle body speed Vw, the wheel speed Vx, and the deviation hV are used as the wheel slip (state quantity) Sw. The wheel slip ratio obtained by dividing the deviation hV by the vehicle body speed Vx may be adopted as the wheel slip Sw.

Specifically, the rear wheel target liquid pressure Ptr is converted into a target slip Str. Furthermore, the actual rear wheel slip Swr is calculated based on the rear wheel speed Vwr and the vehicle body speed Vx. Then, the energization amount to the rear wheel charge valve UPr is adjusted such that the actual rear wheel slip Swr (actual value) approaches and matches the rear wheel target slip Str (target value).

On the other hand, in a vehicle in which the regenerative generator is provided on the rear wheel WHr, the target rotation number Nt in step S200 is calculated based on the rear wheel target liquid pressure Ptr. In the servo control in step S220, the liquid pressure deviation hP is calculated based on the rear wheel target liquid pressure Ptr and the adjusted liquid pressure Pc (hP=Ptr−Pc). Similarly to the above, the energization amount to the electromagnetic valve UC is adjusted such that the liquid pressure deviation hP becomes "0" and the adjusted liquid pressure Pc approaches the rear wheel target liquid pressure Ptr. Furthermore, in step S240, the liquid pressure deviation hQ is calculated based on the front wheel target liquid pressure Ptf and the front wheel output liquid pressure Ppf (the detection value of the front wheel output liquid pressure sensor PPf). Then, the energization amount to the front wheel charge valve UPf is adjusted so that the liquid pressure deviation hQ becomes "0" and the front wheel output liquid pressure Ppf (actual value) approaches the front wheel target liquid pressure Ptf (see parentheses of step S240).

Similarly, when the front wheel output liquid pressure sensor PPf is omitted, the deceleration slip of the wheel (wheel slip) Sw is used as a state variable, and the slip servo control is executed. For example, the vehicle body speed Vw, the wheel speed Vx, and the deviation hV are used as the wheel slip (state quantity) Sw. The wheel slip ratio obtained by dividing the deviation hV by the vehicle body speed Vx may be adopted as the wheel slip Sw.

In the slip servo control based on the front wheel slip Swf, first, the front wheel target liquid pressure Ptf is converted into the front wheel target slip Stf, and the front wheel actual slip Swf is calculated based on the front wheel speed Vwf and the vehicle body speed Vx. Then, the energization amount to the front wheel charge valve UPf is adjusted such that the actual front wheel slip Swf approaches and matches the front wheel target slip Stf.

Front-Rear Distribution of Braking Force in Regenerative Cooperative Control

Figure 3A:
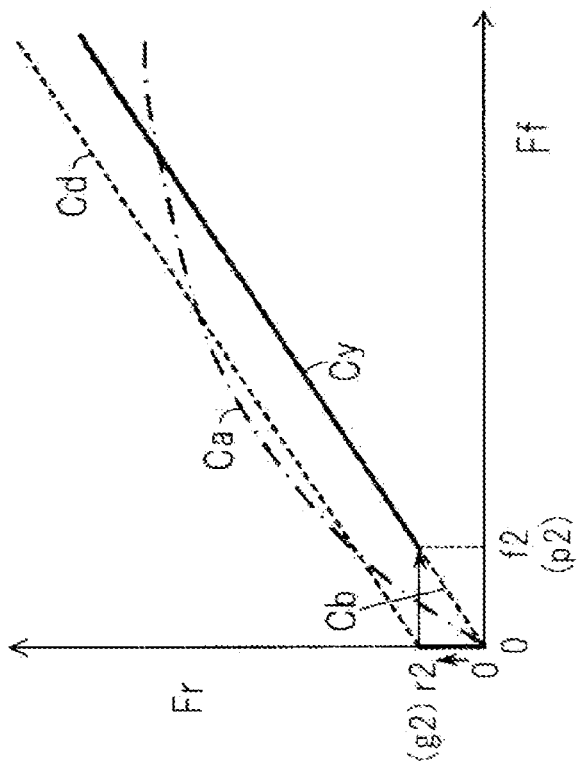
FIG. 3 is a characteristic diagram describing a front-rear distribution (independent control) of a braking force in the regenerative cooperative control.
Figure 3B:
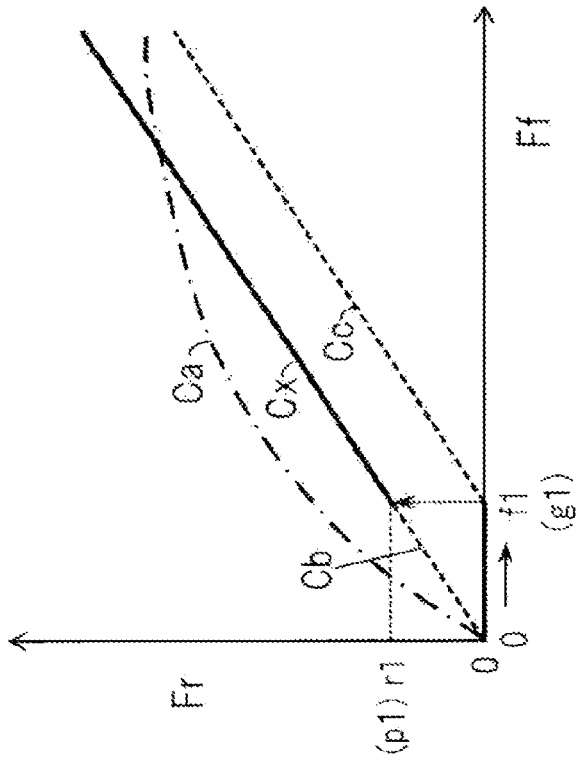

With reference to the characteristic diagram of FIG. 3, the front-rear distribution of the braking force in the regenerative cooperative control will be described in relation to the calculation process shown in FIG. 2. FIG. 3(a) shows a characteristic when the generator GN is provided on the front wheel WHf, and is not provided on the rear wheel WHr. Conversely, FIG. 3(b) shows a case where the generator GN is provided on the rear wheel WHr and is not provided on the front wheel WHf. A system in which the liquid pressure is independently controlled between the braking systems of the front and rear wheels using the lower fluid unit YL is referred to as "independent control".

As described above, components, calculation processes, signals, characteristics, and values denoted by the same symbols are of the same function. The suffixes "i" to "l" at the end of the symbols are comprehensive symbols indicating which wheel is related to, "i" indicates the right front wheel, "j" indicates the left front wheel, "k" indicates the right rear wheel, and "l" indicates the left rear wheel. When the suffixes "i" to "l" are omitted, each symbol represents a generic name of each of the four wheels. The suffixes "f" and "r" at the end of the symbols are comprehensive symbols indicating which system of the front and rear wheels is related to in the fluid passages of two systems (the movement path of the braking BF), "f" Indicates a front wheel system, and "r" indicates a rear wheel system. If the suffixes and "r" are omitted, they represent the generic name of the two systems. In each fluid passage, "upstream side (or upper part)" is a side closer to the reservoir RV, and "downstream side (or lower part)" is a side closer to the wheel cylinder CW.

[When Generator GN for Energy Regeneration is Provided on Front Wheel WHf]

With reference to the characteristic diagram of FIG. 3(a), the independent control of the regenerative cooperative control in a vehicle in which the regenerative generator GN is provided on the front wheel WHf will be described. The characteristic diagram shows the relationship between the front wheel braking force Ff including the regenerative braking force and the rear wheel braking force Fr. Since the generator GN is not provided on the rear wheel WHr, no regenerative braking force acts on the rear wheel WHr, and only the friction braking force acts on the rear wheel.

A characteristic Ca indicated by an alternate long and short dash line represents a so-called ideal braking force distribution in which variation in the ground load (vertical force) of the front and rear wheels involved in the vehicle deceleration is considered. Specifically, in the ideal distribution characteristic Ca, the braking forces Ff and Fr of the front and rear wheels are proportional to the dynamic ground load (vertical force) that takes into consideration the vehicle deceleration. Therefore, in the ideal distribution characteristic Ca, when the anti-skid control is not executed, the front wheel WHf and the rear wheel WHr are simultaneously wheel-locked even on road surfaces having different friction coefficients, and the friction braking force is maximized.

A characteristic Cb represents a relationship between the front wheel braking force Ff and the rear wheel braking force Fr when the regenerative braking force does not act (i.e., "Rg=0"). The characteristic Cb is based on "the pressure receiving area of the front and rear wheel cylinders CWf and CWr", "the effective braking radius of the rotating members KTf and KTr", and "the friction coefficient of the friction material of the front and rear wheels". In a typical vehicle, the pressure receiving area of the wheel cylinder CW, the effective braking radius of the rotating member KT, and the friction coefficient of the friction material are set such that the characteristic Cb becomes smaller than the ideal distribution characteristic Ca within a range of normal braking (within region excluding region where maximum braking force is generated) so that the rear wheel WHr is not wheel-locked preceding the front wheel WHf. In the region where the maximum braking force is generated, the braking force distribution control (so-called EBD control) is executed based on the wheel speed Vw so that the deceleration slip of the rear wheel WHr does not become greater than the deceleration slip of the front wheel WHf.

When the operation of the brake operation member BP is started, in the initial stage of braking, the friction braking force does not act as the front and rear wheel braking forces Ff and Fr based on steps S160 and S170 (i.e., since "Ptf=0, Ptr=0"). That is, the front wheel braking force Ff is increased toward a first predetermined force f1 only by the regenerative braking force, and the rear wheel braking force Fr is maintained at "0". At this time, the input piston PN is moved in the advancing direction Ha depending on the operation of the brake operation member BP, and the capacity of the input chamber Rn is reduced. Due to the reduction in capacity, the brake liquid BF flows into the simulator SS, and an operation force Fp acts on the brake operation member BP. Since the input piston PN and the master piston PM are separated by the gap Ks, even if the input piston PN is moved forward, the master piston PM is not pressed by the input piston PN. Furthermore, since the adjusted liquid pressure Pc is maintained at "0", the front wheel brake liquid pressure Pwf (=Ppf) and the rear wheel brake liquid pressure Pwr (=Ppr) remain at "0".

Furthermore, when the operation amount Ba of the brake operation member BP is increased and the front wheel braking force Ff reaches the first predetermined force f1 (i.e., the regeneration amount Rg reaches a first predetermined amount g1 corresponding to the first predetermined force f1), the determination condition of step S150 is satisfied, and the processes of step S180 and step S190 are executed. First, at the time point (calculation cycle) when step S150 (the condition of "Gt≥rg (=g1)") is satisfied, the rear wheel target liquid pressure Ptr is determined to be "the first predetermined liquid pressure p1 corresponding to the first predetermined force r1" so that the rear wheel braking force Fr rapidly increases from "0" to the first predetermined force r1. The stepwise sudden increase of the rear wheel brake liquid pressure Pwr (=Ppr) from "0" is achieved by the lower fluid unit YL (particularly, the rear wheel charge valve). After such time point, the front wheel target liquid pressure Ptf is monotonously increased from "0" in accordance with the increase in the operation amount Ba so that the friction braking force Fp increases along the characteristic Cb. Furthermore, the rear wheel target liquid pressure Ptr is calculated to monotonously increase from "the first predetermined liquid pressure p1 corresponding to the first predetermined force r1" in accordance with the increase in the operation amount Ba. As a result, in "Ff<f1", "Fr=0", and in "Ff>f1", a characteristic Cx that matches the characteristic Cb is achieved.

In steps S200 and S210, the electric motor MC is driven by the rotation number servo control, and the reflux of the brake liquid BF including the fluid pump QC and the electromagnetic valve UC is formed. Then, in step S220, the liquid pressure servo control based on the target liquid pressure Pt (particularly, the front wheel target liquid pressure Ptf) is executed, and the electromagnetic valve UC is controlled so that the adjusted liquid pressure Pc (the detection value of the adjusted liquid pressure sensor PC) matches the front wheel target liquid pressure Ptf. As a result, the braking force Ff acts on the front wheel WHf as a resultant force of a regenerative braking force corresponding to the first predetermined amount g1 (=rg) and a friction braking force corresponding to the adjusted liquid pressure Pc. Furthermore, in step S230, the electric motor ML of the lower fluid unit YL is rotationally driven, and the reflux of the brake liquid BF including the rear wheel fluid pump QLr and the rear wheel charge valve UPr is formed. In step S240, the liquid pressure servo control based on the rear wheel target liquid pressure Ptr is executed, the adjusted liquid pressure Pc is increased, and the rear wheel charge valve UPr is controlled so that the rear wheel output liquid pressure Ppr (the detection value of the rear wheel output liquid pressure sensor PPr) matches the rear wheel target liquid pressure Ptr. As a result, a friction braking force Fr corresponding to the rear wheel output liquid pressure Ppr acts on the rear wheel WHr.

When the rear wheel output liquid pressure sensor PPr is omitted, in step S240, the rear wheel target slip Str corresponding to the rear wheel target liquid pressure Ptr is calculated, and a slip servo control based on the rear wheel target slip Str is executed. Specifically, the vehicle body speed Vx is calculated based on the wheel speed Vw (the detection value of the wheel speed sensor VW), and the actual rear wheel slip (actual value) Swr is calculated based on the vehicle body speed Vx and the rear wheel speed Vwr (the detection value of the rear wheel speed sensor VWr). Then, the rear wheel charge valve UPr is controlled such that the actual slip Swr of the rear wheel approaches the target slip Str, so that the output liquid pressure Ppr is increased from the adjusted liquid pressure Pc.

In the regenerative cooperation unit YK, "the input piston PN that is mechanically connected to the brake operation member BP and is cooperatively operated with the brake operation member BP" and "the master piston PM that can move in conjunction with the operation of the brake operation member BP" are arranged with the gap Ks. Then, the gap Ks is controlled by the adjusted liquid pressure Pc, and cooperative control of the regenerative braking force and the friction braking force is achieved. For example, a state is formed in which the brake operation member BP is operated, but no friction braking force is generated on the wheel WH and only the regenerative braking force is applied. Therefore, sufficient energy can be regenerated by the generator GN. In the regenerative cooperation unit YK, the setting of the gap Ks at the time of non-braking (initial value ks) corresponds to the maximum value of the regeneration amount Rg (e.g., set to a predetermined amount rg). That is, the range of the regeneration amount Rg can be set until the separation displacement Ks becomes "0".

For example, when the rear wheel target liquid pressure Ptr is increased not from the first predetermined liquid pressure p1 but from "0" (that is, when independent control is not performed and "Ptf=Ptr"), the front and rear wheel braking forces Ff and Fr are as shown by a characteristic Cc. The rear wheel braking force Fr in the characteristic Cc is smaller than the rear wheel braking force Fr in the ideal distribution characteristic Ca. For this reason, in the characteristic Cc, the vehicle stability is ensured, but the rear wheel braking force Fr cannot be fully utilized.

In order to effectively use the rear wheel braking force Fr, the adjusted liquid pressure Pc is increased and adjusted by the rear wheel charge valve UPr of the lower fluid unit YL, and the liquid pressures (output liquid pressures) Ppf and Ppr of the braking systems of the front and rear wheels are independently controlled. Thus, the braking forces Ff, Fr of the front and rear wheels are suitably ensured so that the front wheel braking force Fr is sufficiently utilized, and a regeneratable energy amount can be sufficiently ensured while the vehicle stability is maintained.

When generator GN for energy regeneration is provided on rear wheel WHr Next, with reference to FIG. 3(b), the independent control of the regenerative cooperative control will be described for the vehicle in which the regenerative generator GN is provided on the rear wheel WHr. The characteristic diagram shows the relationship between the front wheel braking force Ff based on only the friction braking force and the rear wheel braking force Fr including the regenerative braking force. Similarly to the above, the characteristic Ca indicated by the alternate long and short dash line is a diagram of the ideal braking force distribution. In the following description, differences from FIG. 3(a) will be mainly described.

When the operation of the brake operation member BP is started, in the initial stage of braking (the state of "Gt<rg (=g2)"), "Ptf=0, Ptr=0" is calculated, and no friction braking force is generated. Therefore, the rear wheel braking force Fr is increased toward a second predetermined force r2 only by the regenerative braking force, but the front wheel braking force Ff remains at "0". Similarly to the above, depending on the operation of the brake operation member BP, the brake liquid BF flows into the simulator SS, and even if the friction braking force is not generated (that is, even if the brake liquid pressure Pw remains at "0"), the operation force Fp of the brake operation member BP is generated.

When the operation amount Ba of the brake operation member BP is increased and the rear wheel braking force Fr reaches the second predetermined force r2 (i.e., the regeneration amount Rg reaches a second predetermined amount g2 corresponding to the second predetermined force r2), the positive determination is made in step S150, and the processes of step S180 and step S190 are executed. First, at the time point (calculation cycle) when positive determination is made in step S150, the front wheel target liquid pressure Ptf is calculated to be "the second predetermined liquid pressure p2 corresponding to the second predetermined force f2" so that the front wheel braking force Ff rapidly increases from "0" to the second predetermined force f2. The stepwise sudden increase of the front wheel brake liquid pressure Pwf Ppf) from "0" is achieved by the lower fluid unit (particularly, the front wheel charge valve UPf). After such time point, the friction braking force is increased along the characteristic Cb (relationship between the front wheel braking force Ff and the rear wheel braking force Fr when the regenerating braking force does not act defined by the pressure receiving area of the wheel cylinder CW, the effective braking radius of the rotating member KT, and the friction coefficient of the friction material). Specifically, the front wheel target liquid pressure Ptf is calculated to monotonically increase from "the second predetermined liquid pressure p2 corresponding to the second predetermined force f2" according to the increase in the operation amount Ba. Furthermore, the rear wheel target liquid pressure Ptr monotonically increases from "0" in accordance with the increase in the operation amount Ba. That is, when "Fr<r2", "Ff=0", and when "Fr>r2", a characteristic Cy that matches the characteristic Cb is achieved.

Similarly to the above, in steps S200 and S210, the rotation number servo control is executed in the electric motor MC so that the actual value Na of the rotation number matches the target value Nt corresponding to the rear wheel target liquid pressure Ptr. Then, in step S220, the liquid pressure servo control is performed in the electromagnetic valve UC such that the actual value Pc of the liquid pressure matches the target value Pt (particularly, the rear wheel target liquid pressure Ptr). As a result, a resultant force Fr of the regenerative braking force corresponding to the predetermined regeneration amount rg and the friction braking force corresponding to the adjusted liquid pressure Pc acts on the rear wheel WHr. In step S230, the electric pump DL (particularly, the electric motor ML) is rotated, and in step S240, the liquid pressure servo control is executed in the front wheel charge valve UPf so that the actual value Ppf in the output liquid pressure matches the target pressure Ptf. Thus, the adjusted liquid pressure Pc is increased, the front wheel output liquid pressure Ppf is formed, and independent control of the front and rear wheel systems is achieved.

When the front wheel output liquid pressure sensor PPf is omitted, in step S240, the front wheel target slip Stf corresponding to the front wheel target liquid pressure Ptf is calculated, and the actual value Swf of the front wheel slip is calculated based on the front wheel speed Vwf and the vehicle body speed Vx. Then, the slip servo control of the front wheel charge valve UPf is executed so that the actual value Swf matches the target value Stf. Even in this case, the front wheel output liquid pressure Ppf is formed by being increased from the adjusted liquid pressure Pc.

Similarly to the above, the gap (separation displacement) Ks between the input piston PN and the master piston PM is adjusted by the adjusted liquid pressure Pc, and the regenerative cooperative control is achieved.

When the front wheel target liquid pressure Ptf is increased not from the second predetermined liquid pressure p2 but from "0" (that is, when independent control is not performed and "Ptf=Ptr"), a characteristic Cd is obtained. The rear wheel braking force Fr in the characteristic Cd is larger than the rear wheel braking force Fr in the ideal distribution characteristic Ca. Therefore, in the characteristic Cd, the rear wheel braking force Fr is sufficiently utilized, but there is a concern about vehicle stability. To improve the stability of the vehicle, the adjusted liquid pressure Pc is increased and adjusted by the front wheel charge valve UPf of the lower fluid unit YL, and the output liquid pressures Ppf and Ppr of the braking systems of the front and rear wheels are individually controlled. Thus, the distribution of the braking forces Ff and Fr of the front and rear wheels is appropriately adjusted, and both maintaining of vehicle deceleration and vehicle stability, and ensuring of regenerative energy can be achieved.

Figure 4:
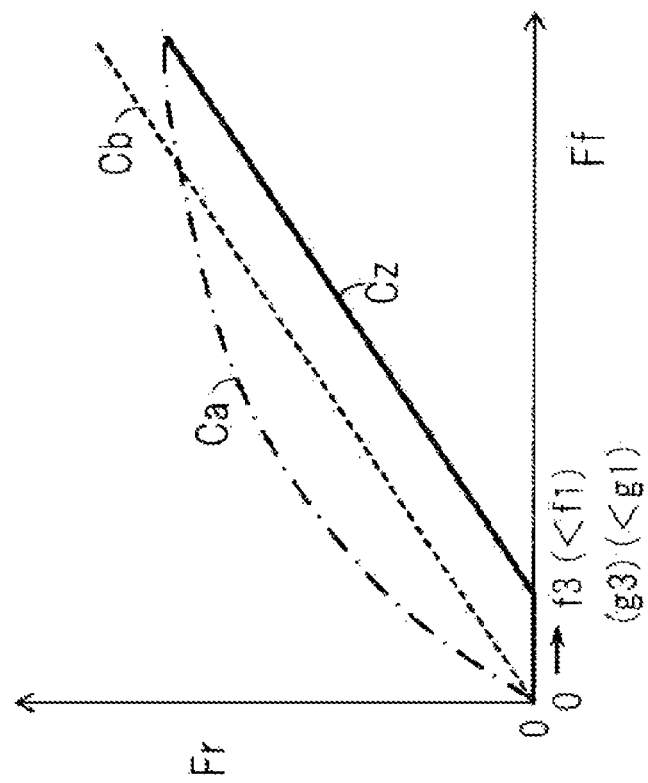
FIG. 4 is a characteristic diagram describing a front-rear distribution (identical control) of another braking force in the regenerative cooperative control.

Another Front-Rear Distribution of Braking Force in Regenerative Cooperative Control With reference to the characteristic diagram of FIG. 4, another front-rear distribution of the braking force in the regenerative cooperative control will be described. As described above, the lower fluid unit YL is used, the adjusted liquid pressure Pc of the pressure adjusting unit YC is increased, and the independent control is achieved. Instead of independent control, the braking systems of the front and rear wheels can be controlled identically. This control is referred to as "identical control".

In the identical control of the regenerative cooperative control, the front wheel target liquid pressure Ptf and the rear wheel target liquid pressure Ptr are calculated as the same value (Ptf=Ptr) in step S190 of the control flowchart described with reference to FIG. 2. Then, in step S220, the adjusted liquid pressure Pc formed by the liquid pressure servo control of the electromagnetic valve UC (control for rapidly matching the detection value Pc to the target value Pt) is supplied as it is to the front wheel cylinder CWf and the rear wheel cylinder CWr. In the identical control, the lower fluid unit YL is not used in the pressure adjusting control, and the regenerative cooperative control is executed only by the upper fluid unit YU. Thus, the processes of steps S230 and S240 are omitted.

A vehicle in which the regenerative generator GN is provided on the front wheel WHf (the generator GN is not provided on the rear wheel WHr) will be described as an example. When the operation of the brake operation member BP is started and "Gt<rg (=g3)", no friction braking force is generated, and only the regenerative braking force acts on the vehicle. When the operation amount Ba of the brake operation member BP is increased and the target deceleration Gt becomes greater than or equal to a third predetermined amount g3 (=rg), the adjusted liquid pressure Pc is increased from "0" and introduced to the front and rear wheel cylinders CWf and CWr. Therefore, when the front wheel braking force Ff by the generator GN reaches a third predetermined force f3 corresponding to the third predetermined amount g3, the front and rear wheel braking forces Ff and Fr by the adjusted liquid pressure Pc are started to increase. Here, the third predetermined amount g3 is set smaller than the first predetermined amount g1 (see FIG. 3(a)).

In the identical control of the regenerative cooperative control, when the front wheel braking force Ff is less than the third predetermined force f3, only the regenerative braking force is generated, and no friction braking force is generated. Then, when the target deceleration Gt becomes greater than or equal to the third predetermined amount g3 and the front wheel braking force Ff becomes greater than or equal to the third predetermined force f3, the adjusted liquid pressure Pc is increased from "0", and the friction braking force of the front and rear wheels is increased from "0". Therefore, the front-rear distribution of the braking force of the identical control is as shown in a characteristic Cz.

Since the adjusted liquid pressure Pc is supplied to the front and rear wheel cylinders CWf and CWr, the characteristic Cz is a characteristic parallel to the characteristic Cb and smaller than the characteristic Cb. In the identical control, maximization of the regenerative energy cannot be achieved as compared with the independent control. However, in the identical control, the regenerative energy amount and the vehicle stability can be appropriately balanced.

Another Configuration Example of Regenerative Cooperation Unit YK

Figure 5:
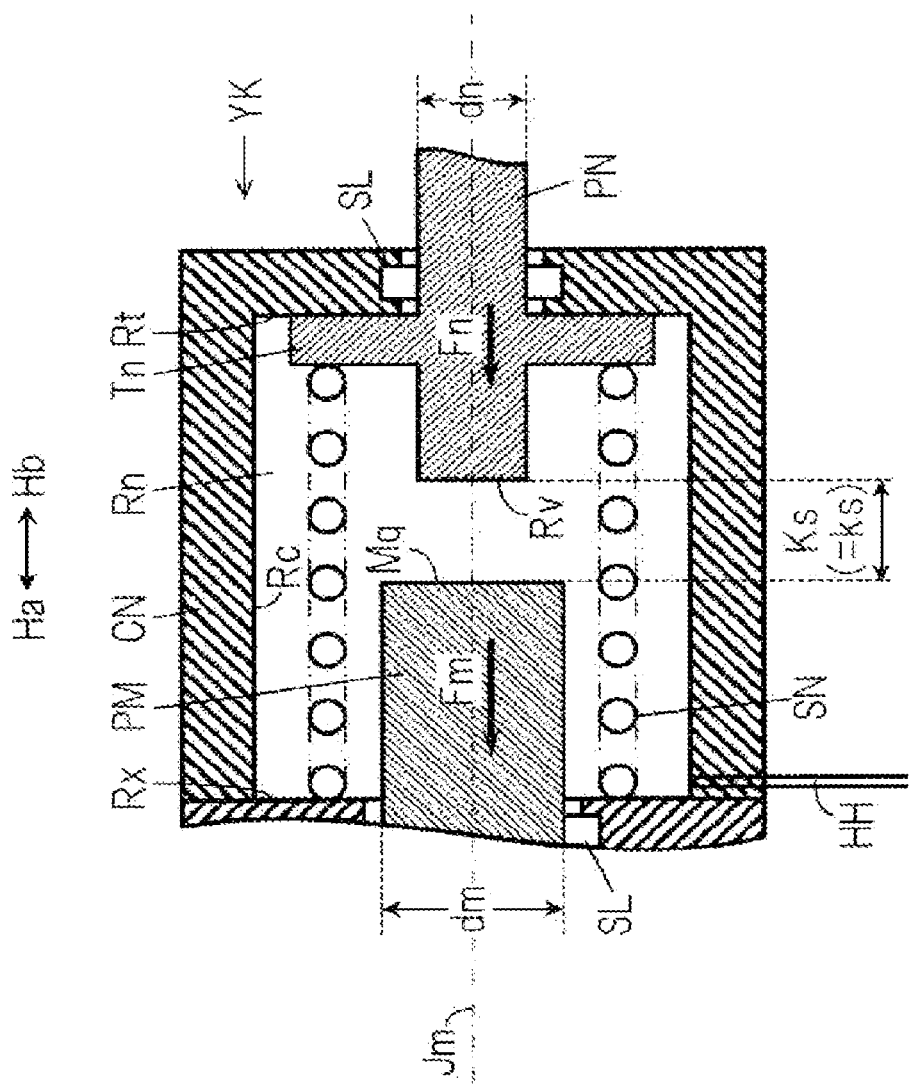
FIG. 5 is a schematic view describing another configuration example of a regenerative cooperation unit YK.

Another configuration example of the regenerative cooperation unit YK will be described with reference to the schematic view of FIG. 5. In the regenerative cooperation unit YK described with reference to FIG. 1, the diameter dm of the master piston PM and the diameter dn of the input piston PN are set to be equal. Alternatively, the diameter dm of the master piston PM can be set to be larger than the diameter dn of the input piston PN.

As described above, the input cylinder CN is fixed to the master cylinder CM by the mounting surface Rx. The input piston PN is inserted into the input cylinder CN so as to slide therein. The input piston PN is mechanically connected to the brake operation member BP through a clevis and the like so as to cooperatively operate with the brake operation member BP. The input piston PN is provided with the flange portion Tn, and the compression spring (input elastic body) SN is provided between the flange portion Tn and the mounting surface Rx of the input cylinder CN. The input elastic body SN presses the flange portion Tn in the retreating direction Hb along the center axis Jm. At the time of non-braking, the flange portion Tn is abutted against the bottom portion Rt of the input cylinder CN. This state is a position (initial position of the input piston PN) at which the input piston PN is at the most retreating direction Hb.

In addition, at the time of non-braking, the stepped portion My of the master piston PM is abutted against the second bottom portion Mt of the master cylinder CM. At this time, the end Mq of the master piston PM is inside the input cylinder CN. This state is a position (initial position of the master piston PM) at which the master piston PM is at the most retreating direction Hb. At the time of non-braking (that is, when both the pistons PN and PM are at the initial position), the gap Ks between the end Mq of the master piston PM and the end Rv of the input piston PN is equal to the initial gap ks (predetermined value).

The diameter of the master piston PM in the input cylinder CN is a diameter dm, and the cross-sectional area is a predetermined value am. Furthermore, when the brake operation member BP is operated, the diameter of the input piston PN that enters the input cylinder CN is a predetermined value dn, and a cross-sectional area thereof is a predetermined value an. Here, the diameter dm (i.e., area am) may be set to be larger than the diameter dn (i.e., area an) (dm>dn, am>an).

The manual braking is realized when the first switching valve VA is at the closed position and the input cylinder CN is fluid-locked (that is, the brake liquid BF is sealed). By the fluid lock, the amount of brake liquid BF in the input chamber Rn of the input cylinder CN is maintained constant. When the force Fn acts on the input piston PN and the input piston PN moves in the advancing direction Ha, the liquid pressure in the input cylinder CN (input chamber Rn) increases. Since the area am is larger than the area an in the pressure receiving area of each piston, the force Fm acting on the master piston PM is larger than the force Fn of the input piston PN. Specifically, the ratio of the output area am to the input area an (area ratio "am/an") multiplied by the force Fn is output as the force Fm (Fm=Fn×(am/an)). Furthermore, since the volume of the brake liquid BF in the input cylinder CN is constant, the movement amount (displacement) Hm of the master piston PM is smaller than the movement amount (displacement) Hn of the input piston PN. That is, as the input cylinder CN is sealed, the input piston PN and the master piston PM operate as "lever".

The capacity of the master cylinder chamber Rm (i.e., the inner diameter and length of the master cylinder CM) is determined by the rigidity of the braking device (e.g., the rigidity of the caliper, the rigidity of the friction material, and the rigidity of the brake piping). In control braking, even when the friction coefficient between the friction material and the rotating member KT decreases (e.g., when a fade phenomenon occurs), the capacity of the master chamber Rm is set so that the wheel WH can exert the maximum braking force. On the other hand, in manual braking, the master cylinder CM needs to have a relatively small diameter so that the operation force Fp of the brake operation member BP generated by the driver falls within an appropriate range.

As described above, by setting to "am>an", the force (input piston thrust) Fn generated by the operation force Fp is amplified to the force (master piston thrust) Fm (=Fn× (am/an)) in the direction of the center axis Jm. Therefore, under a condition where the operation force Fp is constant, the diameter of the master cylinder CM can be increased as compared with the case where "am=an". As a result, the dimension of the master cylinder CM in the longitudinal direction can be reduced under the condition that the capacity is constant.

Operation/Effect

In the brake control device SC according to the present invention, the front-rear type fluid passage is adopted in the fluid passages of two systems (brake piping, fluid path of fluid unit, hose, etc.). The upper fluid unit YU of the brake control device SC includes a pressure adjusting unit YC, a master unit YM, and a regenerative cooperation unit YK. The pressure adjusting unit YC includes an electric pump DC and an electromagnetic valve UC. In the pressure adjusting unit YC, the brake liquid BF discharged from the electric pump DC is adjusted to the adjusted liquid pressure Pc by the electromagnetic valve UC. The adjusted liquid pressure Pc is directly introduced into the rear wheel cylinder CWr without passing through the master cylinder CM.

The master unit YM includes a master cylinder CM and a master piston PM. The master piston PM can move in conjunction with the operation of the brake operation member BP. The master unit YM includes a master chamber Rm and a servo chamber Rs. The master chamber Rm is connected to the front wheel cylinder CWf. The master chamber Rm generates a force Fb (retreating force) in the retreating direction Hb along the center axis Jm by the master liquid pressure Pm, and applies the force Fb to the master piston PM. The adjusted liquid pressure Pc is introduced (applied) to the servo chamber Rs. With the adjusted liquid pressure Pc, the servo chamber Rs generates a force Fa (advancing force) in the advancing direction Ha opposing the retreating force Fb in the direction of the center axis Jm, and applies the force Fa to the master piston PM. In other words, the advancing force Fa (=Pc×rs) and the retreating force Fb (=Pm×rm) act so as to face each other in the direction of the center axis Jm of the master cylinder CM.

The liquid pressure chamber for the rear wheel cylinder CWr is not provided in the master cylinder CM of the brake control device SC. Therefore, the dimension of the master cylinder CM in the longitudinal direction (the direction of the center axis Jm) is reduced. As a result, the mountability on a vehicle can be improved. In manual braking (braking only by the muscular strength of the driver without depending on the brake control device SC), the required minimum vehicle deceleration can be ensured because the front wheel braking force Ff is dominant.

For example, in pressure adjustment by a motor-driven cylinder as described in Patent Literature 1, the amount of brake liquid BF required for pressure adjustment is limited by the cylinder capacity (particularly, piston displacement in the cylinder). In other words, in order to secure the capacity (volume) of the brake liquid BF required for pressure adjustment, the cylinder has a large diameter and is long. On the other hand, in the brake control device SC according to the present invention, since the circulation (reflux) of the brake liquid BF by the electric pump DC is used to form the adjusted liquid pressure Pc, there is no limitation on the amount of the brake liquid BF. For this reason, in the brake control device SC requiring a large flow rate, downsizing can be achieved.

Furthermore, in the pressure adjusting unit YC, the reflux of the brake liquid BF is narrowed by the electromagnetic valve UC, and the adjusted liquid pressure Pc is adjusted. The electromagnetic valve UC is a normally-open type, and when the energization amount to the electromagnetic valve UC is "0", the reflux is not restricted, and the adjusted liquid pressure Pc is "0". When the energization amount to the electromagnetic valve UC is increased, the orifice effect by the electromagnetic valve UC is exhibited, and the adjusted liquid pressure Pc is increased from "0".

For example, in the device described in Patent Literature 2, the high pressure accumulated in the accumulator is reduced and adjusted by an electromagnetic valve. Since a slight change in the valve opening amount of the electromagnetic valve greatly changes the pressure adjustment result, it is particularly important to ensure pressure adjustment accuracy (liquid pressure resolution) at a low pressure. On the other hand, in the brake control device SC according to the present invention, the adjusted liquid pressure Pc is increased from "0" at the start of braking. Therefore, control accuracy in the low-pressure region can be easily ensured.

The regenerative cooperation unit YK includes the input piston PN the operates in cooperation with the brake operation member BP and the input cylinder CN fixed to the master cylinder CM. In the input cylinder CN of the regenerative cooperation unit YK, the master piston PM and the input piston PN are separated by a gap (separation displacement) Ks on the center axis Jm. In the control braking (braking by the brake control device SC), the brake operation member BP is operated by the gap Ks, a situation in which the liquid pressure Pw of the wheel cylinder CW is remained at "0" and no friction braking force is generated may form. The gap Ks is controlled by the adjusted liquid pressure Pc, and the regenerative cooperative control is achieved by adjusting the adjusted liquid pressure Pc.

The diameter dm of the master piston PM (portion included in the input cylinder CN) is set to be larger than the diameter dn of the input piston PN (portion moved into the input cylinder CN when the brake operation member BP is operated). Therefore, in the input cylinder CN, the cross-sectional area am of the master piston PM is larger than the cross-sectional area an of the input piston PN. In the regenerative cooperation unit YK, "am>an, dm>dn", and thus in manual braking, the force (input piston thrust) Fn acting on the input piston PN is increased and transmitted to the master piston PM as the master piston thrust Fm. Thus, even if the inner diameter of the master cylinder CM (particularly, the master chamber Rm) is set to be large, the operation force Fp at the time of manual braking can be optimized. Therefore, the master cylinder CM can be shortened.

Apart from the upper fluid unit YU, the brake control device SC includes the lower fluid unit YL. The lower fluid unit YL is provided with an electric pump (lower electric pump) DL and a linear pressure adjusting valve (charge valve) UP separately from the electric pump DC. Similar to the pressure adjusting unit YC, the electric pump DL (ML+ QL) forms a reflux of the brake liquid BF, and such reflux is narrowed by the normally open type charge valve UP, and the adjusted liquid pressure Pc is increased and corrected. The lower fluid unit YL achieves independent control of the regenerative cooperative control (individual control of the front wheel braking system and the rear wheel braking system). Since the distribution of the braking force between the front and rear wheels is optimized, the amount of regenerated energy is sufficiently ensured, and the vehicle stability can be suitably maintained.

OTHER EMBODIMENTS

Other embodiments will be described below. In other embodiments as well, the same effects as those described above (e.g., downsizing of the device, improvement of pressure adjusting accuracy, etc.) are obtained.

In the embodiment described above, the vehicle is an electric vehicle or a hybrid vehicle, having a driving motor. Instead, the brake control device SC can be applied to a vehicle having a general internal combustion engine (gasoline engine, diesel engine) and having no driving motor. The brake control device SC has a high responsiveness to the brake liquid pressure Pw, and is therefore suitable, for example, for a vehicle that requires a highly responsive collision damage reduction brake (so-called AEB). In a vehicle without a generator GN, regenerative braking is not generated, and thus the regenerative cooperative control is unnecessary and not performed in the brake control device SC. That is, the vehicle is decelerated only by friction braking by the brake control device SC. In the pressure adjusting control, the control is performed with "Gt=Rg=0".

In the embodiment described above, the linear electromagnetic valves UC and UP each employ a valve whose opening amount is adjusted in accordance with the energization amount. For example, although the electromagnetic valves UC and UP are on/off valves, the valves may be controlled so that the opening and closing of the valves are controlled by a duty ratio and the liquid pressure is linearly controlled.

In the embodiment described above, the liquid pressure servo control or the slip servo control is employed in the drive control of the charge valve UP. Instead, the indicated energization amount (e.g., indicated current) is determined based on the target liquid pressure Pt (Ptf, Ptr), and the energization amount is supplied to the charge valve UP (UPf, UPr) so that the charge valve UP can be driven. Here, in the calculation map of the indicated energization amount, the indicated energization amount is set in advance so that the indicated energization amount becomes larger as the target liquid pressure Pt is larger.

In the embodiment described above, the configuration of the disc type braking device (disc brake) has been exemplified. In this case, the friction member is a brake pad and the rotating member is a brake disc. Instead of the disc type braking device, a drum type braking device (drum brake) can be adopted. In a case where a drum brake is adopted, a brake drum is adopted in place of the caliper. The friction member is a brake shoe, and the rotating member is a brake drum.

In the embodiment described above, the upper fluid unit YU and the lower fluid unit YL are configured separately. The upper fluid unit YU and the lower fluid unit YL may be integrally formed. In this case, the lower controller ECL is included in the upper controller ECU.

The invention claimed is:

1. A vehicle brake control device that adjusts a front wheel liquid pressure in a front wheel cylinder provided on a front wheel of a vehicle, and a rear wheel liquid pressure in a rear wheel cylinder provided on a rear wheel of the vehicle depending on an operation of a brake operation member of the vehicle, the vehicle brake control device comprising:

a pressure adjusting unit that includes an electric pump and an electromagnetic valve, and that adjusts a brake liquid discharged by the electric pump to an adjusted liquid pressure using the electromagnetic valve, and introduces the adjusted liquid pressure to the rear wheel cylinder; and a master unit that includes a master cylinder and a master piston, and that includes a master chamber connected to the front wheel cylinder, and a servo chamber to which the adjusted liquid pressure is introduced and that applies, to the master piston, an advancing force that opposes a retreating force applied to the master piston by the master chamber, wherein the electromagnetic valve is a normally-open type valve, and wherein the electromagnetic valve adjusts the brake liquid discharged by the electric pump to the adjusted liquid pressure by narrowing a reflux flow of the brake liquid.

2. The vehicle brake control device according to claim 1, further comprising a regenerative cooperation unit including an input piston that operates in cooperation with the brake operation member, and an input cylinder fixed to the master cylinder, wherein a gap between the master piston and the input piston is controlled by the adjusted liquid pressure.

3. The vehicle brake control device according to claim 1, wherein the adjusted liquid pressure introduced to the rear wheel cylinder is directly controlled by the pressure adjusting unit without passing through the master cylinder.

* * * * *